United States Patent [19]
Kozuki et al.

[11] Patent Number: 4,665,449
[45] Date of Patent: May 12, 1987

[54] ROTATING HEAD TYPE REPRODUCING APPARATUS

[75] Inventors: Susumu Kozuki, Tokyo; Nobutoshi Takayama, Kanagawa; Hiroo Edakubo; Tatsuzo Ushiro, both of Tokyo; Masahiro Takei, Kanagawa; Kenichi Nagasawa, Tokyo, all of Japan

[73] Assignee: Canon Kabushiki Kaisha, Tokyo, Japan

[21] Appl. No.: 643,301

[22] Filed: Aug. 22, 1984

[30] Foreign Application Priority Data

Aug. 23, 1983 [JP] Japan ............................... 58-153686
Sep. 17, 1983 [JP] Japan ............................... 58-171656
Sep. 28, 1983 [JP] Japan ............................... 58-179738
May 24, 1984 [JP] Japan ............................... 59-105868
May 31, 1984 [JP] Japan ............................... 59-111550
Jun. 1, 1984 [JP] Japan ............................... 59-113625
Jun. 1, 1984 [JP] Japan ............................... 59-113626

[51] Int. Cl.4 .......................................... G11B 5/56
[52] U.S. Cl. .................................. 360/77; 360/10.2; 360/10.3; 360/70; 360/78
[58] Field of Search ..................... 360/10.2, 10.3, 70, 360/77, 78

[56] References Cited

U.S. PATENT DOCUMENTS 4,393,416 7/1983 Takeuchi et al. .................. 360/10.2
4,395,741 7/1983 Kobayashi et al. .................. 360/77
4,489,352 12/1984 Kobayashi et al. ................ 360/10.3

Primary Examiner—George G. Stellar
Attorney, Agent, or Firm—Toren, McGeady and Goldberg

[57] ABSTRACT

A rotating head type reproducing apparatus, arranged to reproduce a recorded signal by tracing, one after another many recording tracks formed on a record bearing medium at a predetermined pitch by a rotating head, includes a moving mechanism for moving the record bearing medium in a direction transverse to the recording tracks; a shifting mechanism for shifting the rotating head in a direction transverse to the rotating plane thereof; a pulse signal generator for generating a pulse signal in association with the moving operation of the moving mechanism on the record bearing medium; a counter for counting the pulse signal, the count datum of the counter being arranged to return to the initial datum every time a predetermined number of pulses of the pulse signal are counted; a timing signal generator for generating a timing signal in association with the rotation of the rotating head; and a control device for forming a control signal for controlling the shifting mechanism on the basis of the count data of the counter and the timing signal.

51 Claims, 117 Drawing Figures

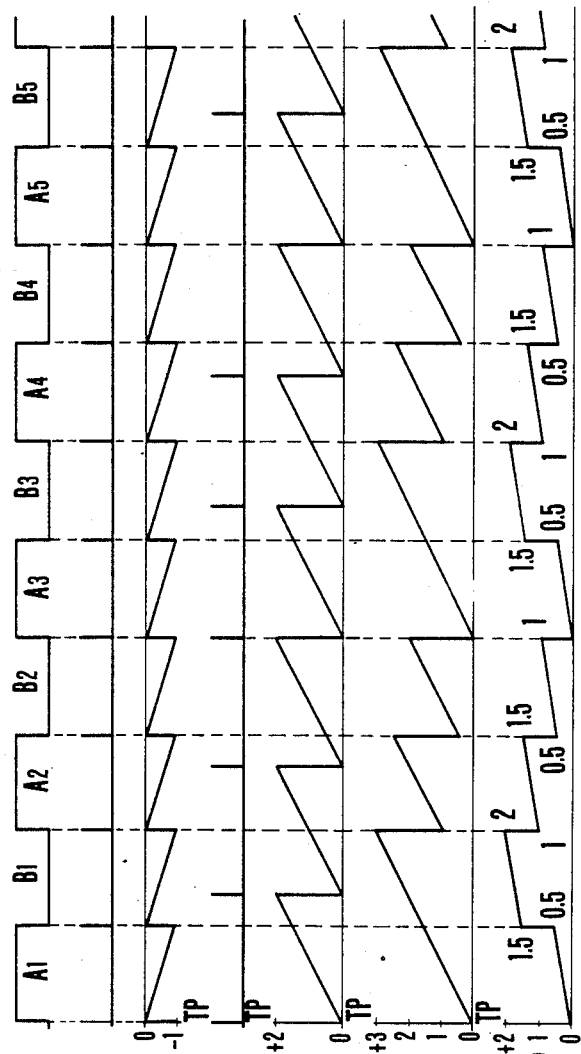

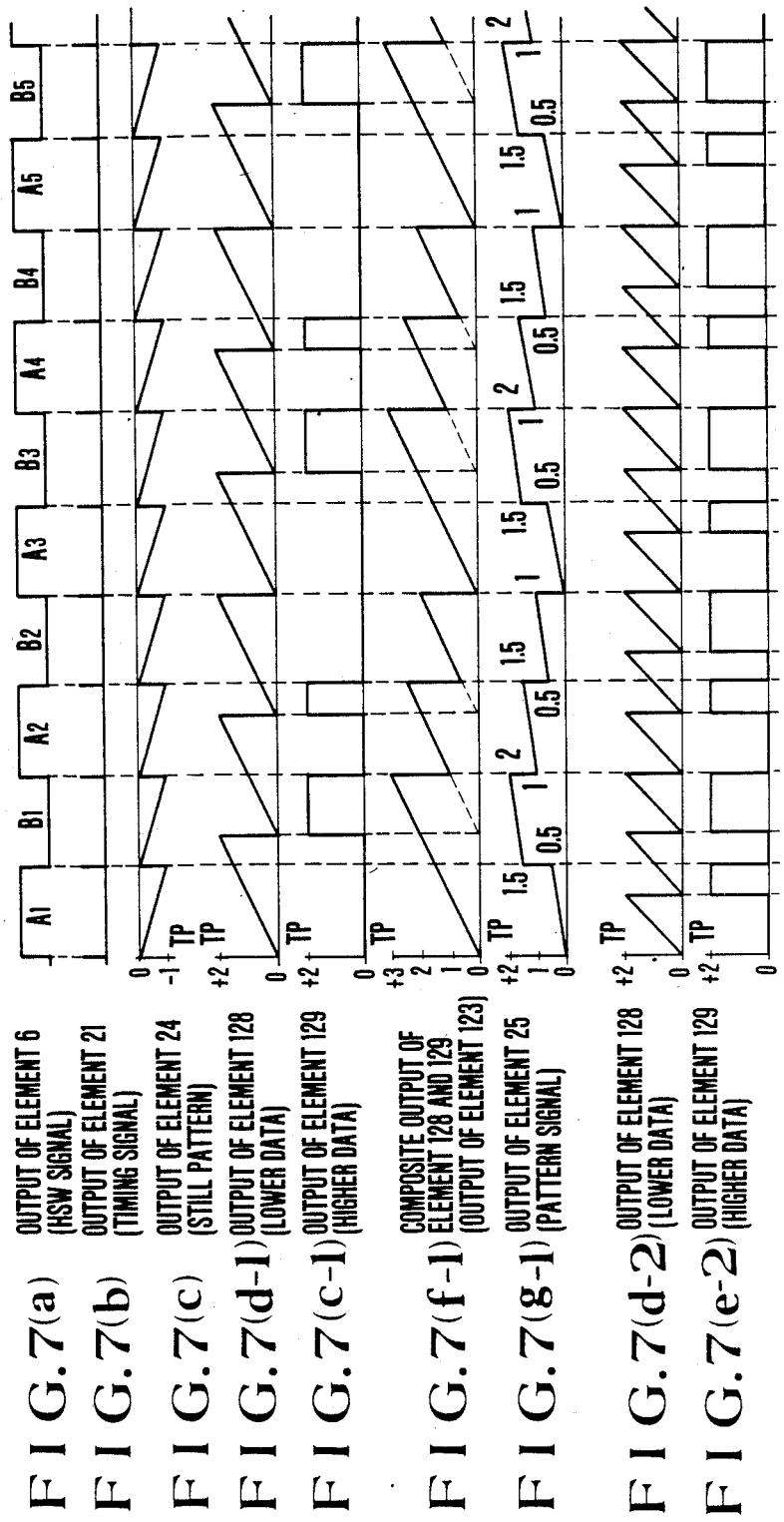

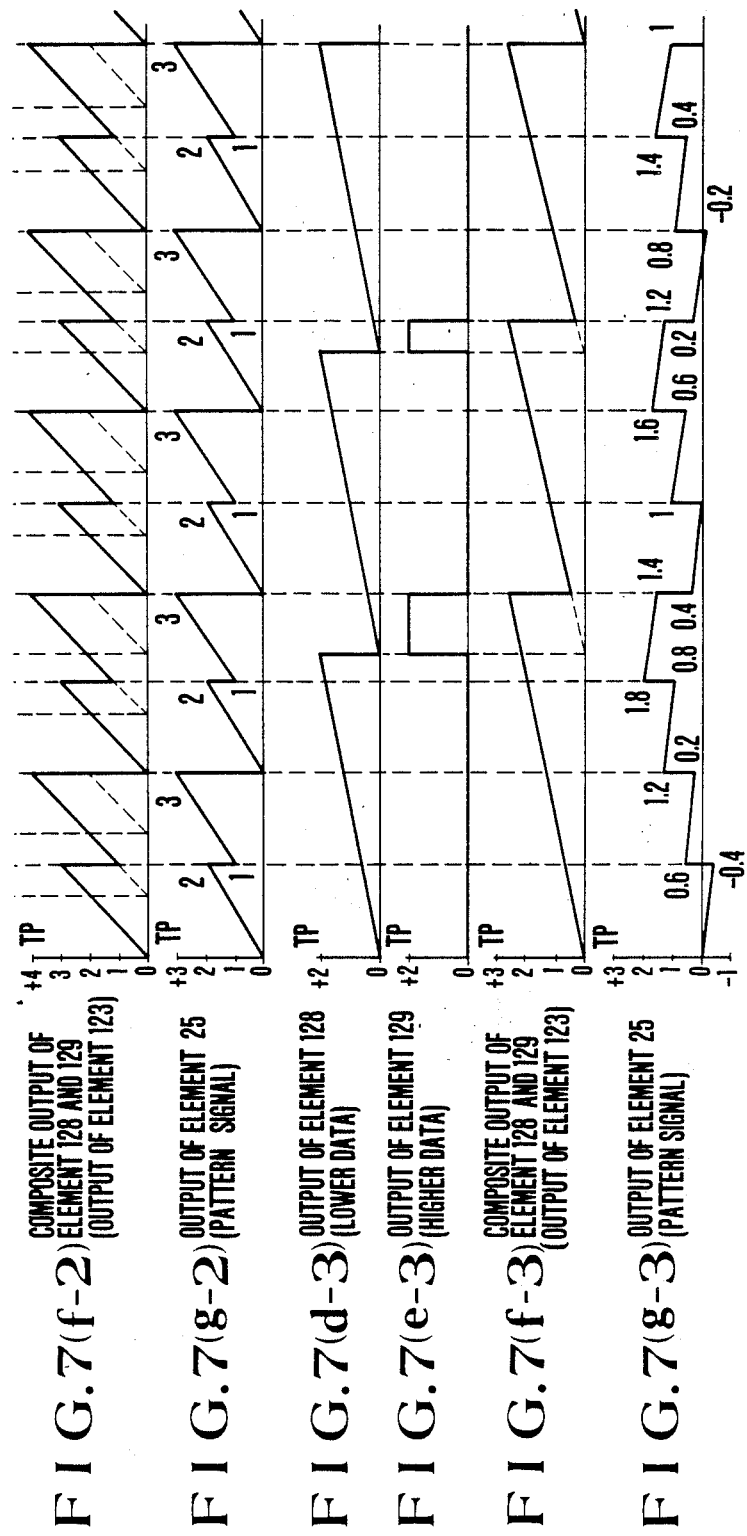

ROTATING HEAD TYPE REPRODUCING APPARATUS

BACKGROUND OF THE INVENTION

1. Field of the Invention

This invention relates to a rotating head type reproducing apparatus and more particularly to an apparatus in which a recorded signal is reproduced in many recording tracks which are formed at a predetermined track pitch on a record bearing medium which is moved by a moving means, these recording tracks being traced one after another by a rotating head which is arranged to be shifted in a direction transverse to the rotating plane thereof.

2. Description of the Prior Art

In order to reproduce a stable and sharp image without noise bars being generated in carrying out so-called special reproduction which is performed at a desired reproducing speed differing from a recording speed employed, such as high speed reproduction, low speed reproduction (including still picture reproduction), reverse reproduction, etc., on a rotating head type reproducing apparatus such as VTR, one recording track must be accurately traced for each scanning field by the reproducing head of the apparatus.

To meet this requirement, a method has been known wherein a pattern signal generating device is arranged to generate a pattern signal corresponding to a distance from the scanning locus of a reproducing head obtained at an arbitrary tape travel speed to a recording track on the tape, and this pattern signal being used to control shifting mans, such as an electrical-to-mechanical conversion element (a bi-morph element, for example), which is arranged to shift the reproducing head in a direction perpendicular to the rotating plane of the head.

FIG. 1 shows a conventional VTR of the above-stated kind, and particularly, the essential parts thereof related to the present invention. A magnetic tape 1 is employed as the record bearing medium. Reproducing magnetic heads 2A and 2B are arranged at the same azimuth angle and are diametrically opposed to each other. These heads are mounted on the respective free ends of electrical-to-mechanical conversion elements 3A and 3B, such as bi-morph elements. The respective opposite ends of these conversion elements 3A and 3B are attached to a rotating member 4. The rotating member 4 is arranged to be rotated by a head rotating motor 5 in the direction of an arrow shown in the drawing. Although omitted from the illustration, the heads 2A and 2B are arranged, as well known, to be rotated in a state such that they protrude from a slit provided between a pair of tape guiding drums. Meanwhile, the tape 1 is obliquely wound, by at least 180 degrees, around the pair of drums. A rotation phase detector 6 is arranged to detect the rotation phase of the heads 2A and 2B. The output of the phase detector 6 is used as a head switch-over signal (hereinafter called the HSW signal) and is also supplied to a head motor control circuit 7. The head motor control circuit 7 is arranged to control the head rotating motor 5 on the basis of the output of the phase detector 6 via a head motor driving circuit 8 in such a manner as to cause the heads 2A and 2B to rotate at a predetermined phase and a predetermined rotational frequency. A control signal reproducing fixed head 9 (hereinafter called the CTL head) is arranged to reproduce a control signal (hereinafter called the CTL signal) recorded along the lower part of the tape at intervals of one frame distance in the longitudinal direction of the tape. A capstan 10 is arranged to form transporting means for moving the tape 1 in the longitudinal direction thereof in conjunction with a pinch roller (not shown). A capstan motor 11 turns the capstan 10. A frequency signal generator 12 is arranged to generate a frequency signal (hereinafter called the capstan FG signal) corresponding to the rotation of the capstan 10. A capstan motor control circuit 13 controls the capstan motor 11 on the basis of the CTL signal from the CTL head 9 and the capstan FG signal from the frequency signal generator 12 in such a way as to cause the capstan 10 to rotate at a predetermined phase and a predetermined rotational frequency. A pattern signal generating circuit 15 generates a pattern signal on the basis of the HSW signal from the rotation phase detector 6, the CTL signal from the CTL head 9 and the capstan FG signal from the frequency signal generator 12 in the event of reproduction at an arbitrary speed (including still picture reproduction and reverse reproduction). This pattern signal is generated for the electrical-to-mechanical conversion elements 3A and 3B and is arranged to cause each of the heads 2A and 2B to trace one recording track on the tape 1 for each scanning field. A conversion element driving circuit 16 drives the conversion elements 3A and 3B according to the pattern signal produced from the pattern signal generating circuit 15.

FIG. 2 shows, by way of example, the arrangement of the above-stated pattern signal generating circuit 15. The circuit 15 includes input terminals 17, 18 and 19 which are arranged to receive the capstan FG signal from the frequency signal generator 12, the CTL signal from the CTL head 9, and the HSW signal from the rotation phase detector 6, respectively. A binary counter 20 is arranged to count the capstan FG signal, applied to the terminal 17 and to be reset by the CTL signal applied to the terminal 18. A timing signal generating circuit 21 generates a timing signal in synchronism with the HSW signal applied to the input terminal 19. A presettable binary counter 22 is arranged to be preset by the timing signal from the timing signal generating circuit 21, with the output of the counter 20 used as preset data PD, and counts the capstan FG signal applied to the input terminal 17. A D/A converter 23 is arranged for digital-to-analog conversion of the output of the presettable counter 22 and produces a first pattern signal therefrom. The circuit 15 further includes an adder 25; an output terminal 26 to which the output of the adder 25 is applied, this output being a conversion element controlling pattern signal (or a driving signal); an oscillator 27 which is arranged to generate clock pulses of a predetermined frequency; a counter 28 for counting the clock pulses generated by the oscillator 27 and is reset by the timing signal produced by the timing signal generating circuit 21; and a D/A converter 29 for digital-to-analog conversion of the output of the counter 28. The output of the counter 22 relates to the moving speed of the record bearing medium, or magnetic tape, while the output of the other counter 28 is independent of the moving speed of the record bearing medium. The D/A converter 29 produces a still picture reproducing fixed pattern signal (or a second pattern signal).

Next, with regard to the special reproducing operation of the VTR which is arranged as described above, the operation of the VTR will be described with reference to FIGS. 3(a)–3(g), 4(A) and 4(B) attaching importance to the operation of the pattern signal generating circuit of FIG. 2. FIGS. 3(d)–3(g) show, respectively, the CTL signal produced in the event of reproduction at a speed increased by 1.5 times; the output of the counter 20 of FIG. 2; the output of the presettable counter 22 (or D/A converter 23) of FIG. 2; and the output of the adder 25. FIGS. 4(A) and 4(B) respectively show the relation of the locus of the scanning center of the heads 2A and 2B to the locus of the center of the recording tracks formed on the tape 1 obtained during still picture reproduction and during reproduction at a speed increased by 1.5 times.

The rotation phase detector 6 produces the HSW signal as shown in FIG. 3(a) accordingly as the heads 2A and 2B are rotated by the head motor 5. Then, the timing signal generating circuit 21 of the pattern signal generating circuit 15 shown in FIG. 2 produces a timing signal as shown in FIG. 3(b) in synchronism with the rise and fall of the HSW signal. The D/A converter 29 produces a still pattern signal, which is as shown in FIG. 3(c), and causes the heads 2A and 2B to continuously shift from 0 to 1 track pitch (hereinafter called TP) within the scanning range of one field.

In this instance, if the field signal, recorded on one recording track by a recording head of the same azimuth angle as that of the reproducing heads 2A and 2B, is to be reproduced alternately by the two heads 2A and 2B to carry out so-called field still reproduction, the relation of the locus of the scanning center of the heads 2A and 2B to the recording track on the tape containing the desired field, becomes as shown in FIG. 4(A). More specifically, with reference to FIG. 4(A), the full lines of the drawing represent the center loci of the recording tracks of the field signal recorded by the recording head having the same azimuth angle as that of the reproducing heads 2A and 2B. Broken lines represent those of a field signal recorded by another recording head of a different azimuth angle from that of the reproducing heads 2A and 2B. An arrow mark double line represents the center locus of scanning performed by the heads 2A and 2B. Meanwhile, a reference symbol CTL represents the recording loci of the CTL signal. (FIG. 4(B) also shows them in the same manner.) As shown, the center locus C of scanning by the heads 2A and 2B (hereinafter called the head locus) becomes a line segment diagonally connecting the beginning of the center locus a of the track to be reproduced (hereinafter called the track locus) to the end of an adjacent track locus b located on the left side of the track locus a. Therefore, in order to correct this and to adjust the head locus C to the track locus a, the following arrangement is necessary: Assuming that the travelling direction of the tape 1 is "+" and the direction reverse thereto is "−", the heads must be continuously shifted from 0 to −1 TP within the scanning range of one field.

Accordingly, in the D/A converter 29 of FIG. 2, the output of the counter 28 is converted to the still pattern signal as shown in FIG. 3(c). Then, the heads 2A and 2B can be satisfactorily shifted for the purpose of the field still reproduction.

Meanwhile, the capstan FG signal produced from the frequency signal generator 12 accordingly as the capstan 10 is rotated by the capstan motor 11 is applied to the counters 20 and 22 of the pattern signal generating circuit 15 of FIG. 2. Then, these counters 20 and 22 count the capstan FG signal. Since the counter 20 is arranged to be reset at every frame by the CTL signal coming from the CTL head 9, the highest value of the count output of the counter 20 is limited to a count value corresponding to +2 track pitches and becomes as shown in FIG. 3(e) in the event of reproduction at a speed increased by 1.5 times because the CTL signal then becomes as shown in FIG. 3(d). Meanwhile, the other counter 22 counts the capstan FG signal while the output of the counter 20 is being preset, at that point of time, by the timing signal (FIG. 3(b)) from the timing signal generating circuit 21. Therefore, the output of the counter 22 (or that of the D/A converter 23), which is produced in the event of reproduction at the speed increased by 1.5 times, becomes as shown in FIG. 3(f). Therefore, the output of the D/A converter 23 and that of the still pattern generator (counter 28 and D/A converter 24) are then added up by the adder 25. As a result, in the event of reproduction at the speed increased by 1.5 times, the adder 25 produces a pattern signal as represented by FIG. 3(g).

In the event of the 1.5 times increased speed reproduction mentioned above, the head loci of the heads 2A and 2B relative to the track loci on the tape 1 become as shown in FIG. 4(B), wherein: Reference symbols A1, A2, A3, . . . , denote the loci of the head 2A, B1, B2, B3, . . . , the loci of the head 2B; and a1, a2, a3, . . . , the track loci of the field tracks recorded by the recording head or heads having the same azimuth angle as that of the heads 2A and 2B. For a first field, in order to adjust the head locus A1 to the track locus a1, the head 2A must be continuously shifted to an extent from 0 to +0.5 TP within the scanning range of the first field. For a second field, in order to adjust the head locus B1 to the track locus a1, the head 2B must be continuously shifted from +1.5 to +2 TP within the scanning range of the second field. For a third field, to adjust the head locus A2 to the next track locus a2, the head 2A must be continuously shifted from +1 TP to +1.5 TP within the scanning range of the third field. For a fourth field, to adjust the head locus B2 to the track locus a3, the head 2B must be continuously shifted from +0.5 TP to +1 TP within the scanning range of the fourth field. The above-stated processes are repeated thereafter in a cycle of four fields. The pattern signal presented by FIG. 3(g) is arranged to satisfactorily carry out the shifting operation required for the heads 2A and 2B.

While the above description covers the 1.5 times increased speed reproduction, by way of example, the pattern signal generating circuit 15 can be arranged to produce any other pattern signal required in controlling the heads 2A and 2B for reproduction at any desired speed other than the speed increased by 1.5 times.

The pattern signal which is thus obtained from the pattern signal generating circuit 15 is supplied to the conversion element driving circuit 16. The driving circuit 16 then drives the electrical-to-mechanical conversion elements 3A and 3B according to the pattern signal to shift the heads 2A and 2B to the recording tracks to be reproduced. The conventional device thus has been arranged on the above-stated operating principle to obtain a noiseless reproduction of a video signal by virtue of the pattern signal for driving the shifting means such as the electrical-to-mechanical conversion elements, etc. However, the conventional rotating head type reproducing apparatus exhibits the following shortcomings:

Today there is a general tendency to abolish the conventional use of the CTL signal for VTR's. Should the VTR no longer use the CTL signal, the conventional pattern signal generating device, which indispensably uses the CTL signal, in generating a pattern signal would no longer be applicable to a VTR.

Further, some tracking error is inevitable in having a noiseless picture reproduced at a varied speed in the above-stated manner. To correct the tracking error, there has been practiced a method in which: The above-stated CTL signal is reproduced during a reproducing operation to detect thereby a tracking error; and the tape moving means, such as the capstan or the above-stated shifting means, is controlled accordingly. However, this method requires a long period of time for tracking. Particularly, in the event of slow motion reproduction where the tape is allowed to travel at a low speed, the time interval at which the CTL signal is reproduced results in an excessively long period of time for tracking. Further, this method makes it impossible to do tracking in the event of still picture reproduction.

Therefore, to make a tracking error signal always obtainable, it is conceivable to use a pilot signal such as the one described in the foregoing for tracking during varied speed reproduction. In carrying out varied speed reproduction, however, every recording track is not reproduced once one after another in the recorded sequence. Therefore, the frequency (or kind) of the pilot signal superimposed on the reproduced track cannot be discriminated. It is, therefore, also impossible to discern the frequency of the pilot signal obtained from adjacent tracks. It has been thus impossible to perform tracking by means of a pilot signal in carrying out varied speed reproduction.

Another problem of the prior art apparatus resides in that: The outputs of the counters 28, 20 and 22 as shown in FIGS. 3(c), 3(e) and 3(f) are not linear. If the number of pulses of the capstan FG signal to be produced per unit of time is infinitely large and the oscillation frequency of the oscillator 27 is extremely high, the outputs could be obtained in the waveforms as represented by FIGS. 3(a)-3(g). In actuality, however, the structural arrangement of the capstan 10, resulting from efforts to reduce the size of the apparatus, limits the number of pulses of the capstan FG signal generated per unit field (or a period during which the record bearing medium is moved to an extent corresponding to 1 TP) to a number from several to then odd pulses. Accordingly, the outputs of the counter 20 and 22 include small stepwise variations. Particularly, in cases where the record bearing medium is moved at a low speed during slow motion reproduction or the like, the number of pulses of the capstan FG signal generated per unit time becomes extremely small and, under such a condition, it is sometimes counted only two or three times per turn of the rotating head.

Therefore, depending on the capstan FG signal and the generation phase of the pulse signal produced by the oscillator 27, the pattern signals produced from the counters 20, 22 and 28 might have their phase deviating from the above-stated timing signal. Generally, this phase deviation increases, accordingly, as the number of pulses in the pulse signal decreases. Therefore, there is some probability that the fixed pattern signal obtained from the D/A converter 23 and the still pattern signal obtained from the D/A converter 29 deviate in phase from each other. Then, the driving pattern signal, obtained through addition, would be useless immediately after generation of the above-stated timing signal, i.e. immediately after switch-over from one head to the other. Accordingly, in that event, the opertaion of the electrical-to-mechanical conversion element becomes unstable before or after the head switch-over.

A further problem of the prior art apparatus lies in that: Generally, the shifting means, which is typically represented by the electrical-to-mechanical conversion element, is incapable of following a sudden change in a driving voltage and thus brings about a ringing phenomenon. FIGS. 5(a) and 5(b) show the relation of the driving voltage impressed on the shifting means to the displacement actually attained. As shown, when the driving voltage falls (or rises) at a point x, some vibration takes place for a while thereafter before the desired displacement is achieved. Under such a condition, it is nearly impossible to achieve good displacement or shifting control over the rotating head. In the event of a rise or fall accompanied by a large change in level, the period of such ringing lengthens to make the control nearly impossible. Therefore, with the driving voltage arranged to be supplied to the shifting means according to the pattern signal, such as the one represented by FIG. 3(g), the level of the driving voltage suddenly changes at the time of switch-over from one field to another. As a result, it has been nearly impossible to have the displacement of the rotating head satisfactorily controlled for the first half-portion of each field.

To solve the above-stated ringing problem, therefore, it has been generally practiced to have the pattern signal, which is generated at the pattern signal generating circuit 15, filtered by a low-pass filter (hereinafter called LPF) which is disposed within the conversion element driving circuit 16 before the pattern signal is applied to the electrical-to-mechanical conversion elements 3A and 3B. However, in the event of a rise or fall accompanied by a large change level, the ringing problem still arises as the cut-off frequency of the LPF cannot be lowered too much.

Another method for solving this problem is conceivable, for example, on the basis of the fact that the pattern signal is not necessary for controlling the head 2A during the periods corresponding to B1, B2, . . . , shown in FIGS. 3(a)-3(g) and, conversely, the pattern signal is not required for controlling the other head 2B during the periods corresponding to A1, A2, . . . . In this method, a fixed pattern signal for shifting the head 2A and another fixed pattern signal for shifting the head 2B are formed separately from each other and are used in such a manner that there takes place no sudden level change in the pattern signal immediately before the effective period of control over each of these heads. However, adoption of this method doubles the scale of circuit arrangement and is not desirable as it would result in complex circuitry.

SUMMARY OF THE INVENTION

It is a principal object of the present invention to provide a rotating head type reproducing apparatus which is capable of solving some or all of the above-stated problems presented by the apparatuses of the prior art.

It is another object of the invention to provide a rotating head type reproducing apparatus of the kind reproducing a recorded signal by tracing, one after another, many recording tracks formed on a record bearing medium at a predetermined pitch, by means of a rotating head which is shifted, by shifting means, in a direction transverse to the rotating plane thereof, wherein a pattern signal, which is necessary for controlling the shifting means in carrying out reproduction at an arbitrary speed, is obtained without recourse to the conventionally employed CTL signal. A rotating head type reproducing apparatus arranged in accordance with this object of the invention, as an embodiment thereof, comprises moving means for moving the record bearing medium in a direction transverse to the recording tracks; shifting means for shifting the rotating head in the direction transverse to the rotating plane thereof; pulse signal generating means for generating a pulse signal in association with the moving operation of the moving means on the record bearing medium; means for generating a timing signal in association with the rotation of the rotating head; counting means for counting the pulse signal, the count datum of the counting means being arranged to return to an initial datum every time a predetermined number of pulses of the pulse signal are counted; and control means for forming a control signal for controlling the shifting means on the basis of the count data of the counting means and the timing signal.

It is a further object of the invention to provide a rotating head type information signal reproducing apparatus of the kind reproducing a recorded information signal by tracing, with a rotating head, one after another, many recording tracks formed on a record bearing medium at a predetermined pitch with one of a plurality of pilot signals of different kinds having different frequencies superimposed on each of the recording tracks, wherein there is provided an arrangement to discriminate the kind of pilot signal superimposed on the recording track being mainly traced by the rotating head. A rotating head type information signal reproducing apparatus, arranged according to the invention as another embodiment thereof, comprises moving means for moving the record bearing medium in a direction transverse to the above-stated recording tracks; pulse signal generating means for generating a pulse signal in association with the record bearing medium moving operation of the moving means; counting means for counting the pulses of the pulse signal, the counting means being arranged to produce a pulse signal every time a predetermined number n of the above-stated pulses are counted; and discriminating means for discriminating, by means of the pulse signal produced from the counting means, the kind of the above-stated pilot signal superimposed on the recording track mainly traced by the rotating head.

It is a further object of the invention to provide a rotating head type reproducing apparatus, wherein, in obtaining a control signal for controlling shifting means which shifts a rotating head in a direction transverse to a rotating plane thereof according to a first pulse signal produced in association with the travel of a record bearing medium and a second pulse signal produced from an oscillator, the two pulse signals are arranged to be inphase with each other so that the control signal can be formed to drive the shifting means in a stable and satisfactory manner and to ensure satisfactory tracking at any arbitrary reproduction speed. Under this object, a rotating head type reproducing apparatus of the kind reproducing a recorded signal by tracing, with a rotating head, one after another, many recording tracks formed on a record bearing medium at a predetermined pitch is arranged, as a further embodiment of invention, to comprise moving means for moving the record bearing medium in a direction transverse to the above-stated recording tracks; shifting means for shifting the rotating head in a direction transverse to the rotating plane thereof; first pulse signal generating means for generating a first pulse signal in association with the record bearing medium moving operation of the moving means; second pulse signal generating means for generating a second pulse signal at a predetermined frequency; adjusting means for adjusting the phase relation between the first and second pulse signals; and control means arranged to form a control signal according to the first and second pulse signals for controlling the shifting means.

It is a still further object of the invention to provide a rotating head type reproducing apparatus of the kind described in the foregoing, wherein the shifting means is effectively prevented from resonating, or ringing, to ensure that a tracking operation can always be accomplished in a satisfactory manner. Under the above-stated object, a rotating head type reproducing apparatus of the kind reproducing a recorded signal by tracking, with a plurality of rotating heads, one after another, many recording tracks formed on a record bearing medium at a predetermined pitch, is arranged, as a further embodiment of the invention to comprise moving means for moving the record bearing medium in a direction transverse to the recording tracks; a plurality of shifting means for shifting the rotating heads in directions transverse to their rotating planes; first pulse signal generating means for generating a first pulse signal in association with the record bearing medium moving operation of the moving means; second pulse signal generating means for generating a second pulse signal of a predetermined frequency; and control means arranged to control one of the shifting means in a process of shifting one of the rotating heads in reproducing operation with a first control signal, which has an inclination determined by the frequencies of the first, and second pulse signals and to control the other shifting means shifting the other rotating head, not in reproducing operation, with a second control signal, which at least partly has a different inclination from that of the first control signal.

The objects described above and further objects and features of the invention will become apparent from the following detailed description of the preferred embodiments thereof taken in connection with the accompanying drawings.

BRIEF DESCRIPTION OF THE DRAWINGS

FIGS. 3(a) to 3(g) show waveforms of the outputs of various parts of FIG. 2;

FIGS. 7(a) to 7(g-3) show input and output waveform of the various circuits of FIG. 6 obtained during reproducing operations performed at varied speeds increased by 1.5 times, 3 times and 0.6 times;

DETAILED DESCRIPTION OF THE PREFERRED EMBODIMENTS

Figure 1:
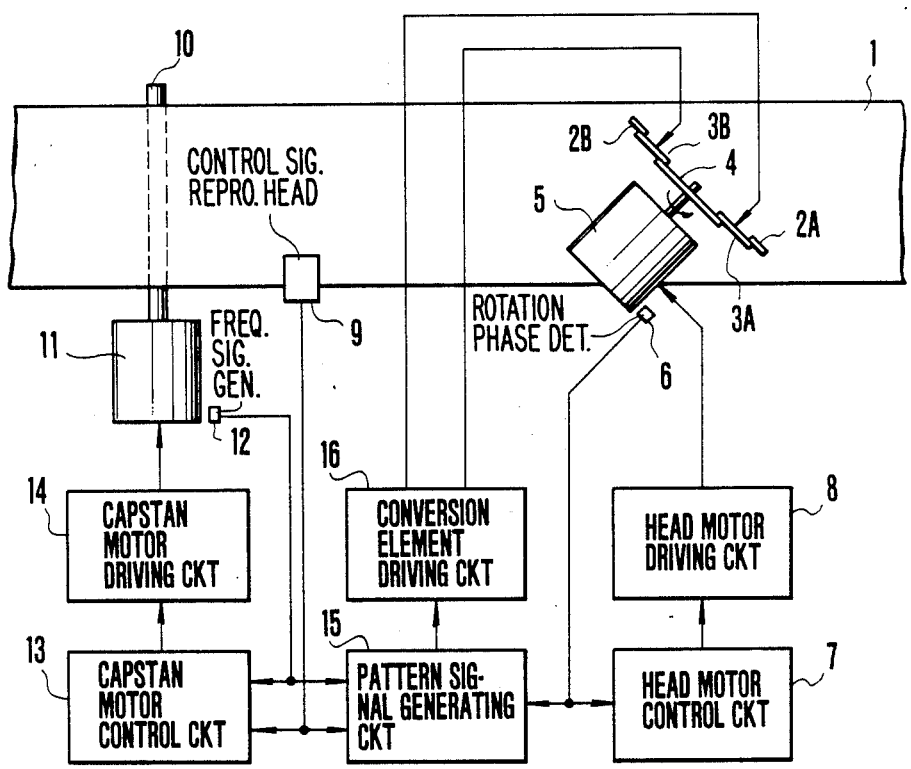
FIG. 1 is a schematic illustration showing the arrangement of essential parts of a conventional VTR.
Figure 6:
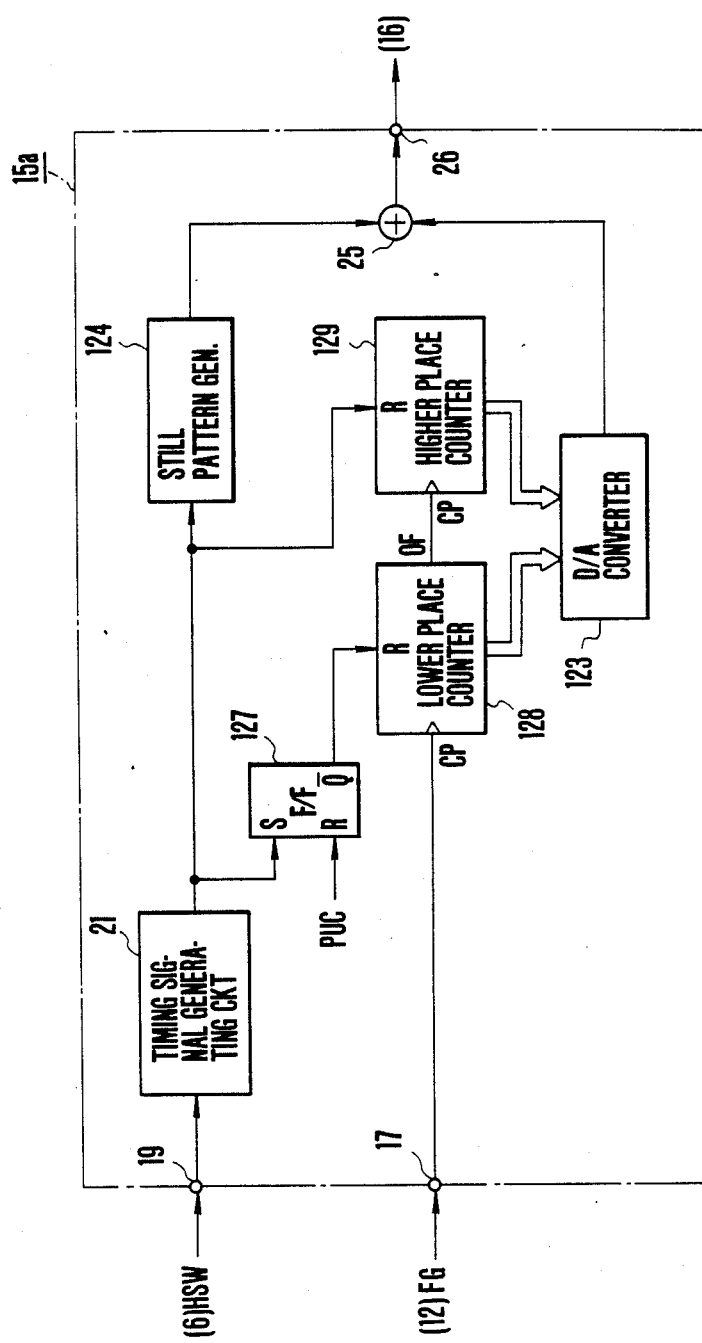
FIG. 6 is a block showing an arrangement of a pattern signal generating circuit of a rotating head type reproducing apparatus (or a VTR) arranged according to the present invention as an embodiment thereof.

The details of this invention will be understood from the following description of embodiments thereof: FIG. 6 shows the arrangement of the essential parts of a VTR arranged according to the invention as a preferred embodiment thereof. In this embodiment, the pattern signal generating circuit 15 of FIG. 1 is replaced with a pattern signal generating circuit which is arranged as shown in FIG. 6. The whole pattern signal generating circuit is indicated by a reference numeral 15a. The circuit 15a is provided with an input terminal 17, which receives the capstan FG signal produced from the frequency signal generator 12 of FIG. 1, and another input terminal 19, which receives the signal HSW produced from the rotation phase detector 6 of FIG. 1. A timing signal generating circuit 21 is arranged in the same manner as the timing signal generating circuit 21 of FIG. 2, and a still pattern generator 124 is arranged in the same manner as the still pattern generator 23 of FIG. 2 and includes the oscillator 27, the counter 28 and the D/A converter 29. An RS flip-flop 127 is arranged to be reset by, for example, a power-up clear pulse (PUC), which will be described later, and to be set by the rise, or fall, of a timing signal produced from the timing signal generating circuit 21. A lower place binary counter 128 counts the capstan FG signal supplied to the input terminal 17. The binary counter 128 is arranged to produce an over-flow signal (hereinafter called OF signal) at the point of time when one frame portion, i.e. two TP portions, of the capstan FG signal has been received and to reset by itself to return to zero at that point of time. The output $\overline{Q}$ of the flip-flop 127 is connected to the reset input terminal of the lower place counter 128. As long as this reset input is at a high level, the counter 128 is kept in a reset state. The counter 128 is enabled to count when the level of the reset input becomes low. A higher place counter 129 is arranged to count the over-flow signal produced from the lower place counter 128. A D/A converter 123 is arranged, in the same manner as the D/A converter 23 of FIG. 2, to receive the count output of the lower place counter 128 as a lower place binary datum and that of the higher place counter 129 as a higher place datum. The D/A converter 123 then combines these count outputs into a composite count value and performs a digital-to-analog conversion on the composite count value. An adder 25 is arranged, in the same manner as the adder 25 of FIG. 2, to add the output of the D/A converter 123 to that of the still pattern generator 124. An output terminal 26 is arranged to supply a pattern signal produced from the adder 25 to the conversion element driving circuit 16 of FIG. 1.

Figure 8A:
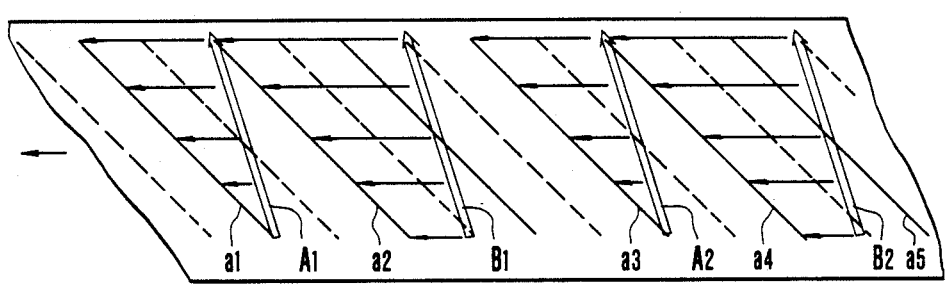
FIGS. 8(A) and 8(B), respectively, show the relation of the center loci of scanning performed by heads to the center loci of recording tracks on the tape obtained in the event of reproduction at the 3 times speed and 0.6 times speed.
Figure 8B:
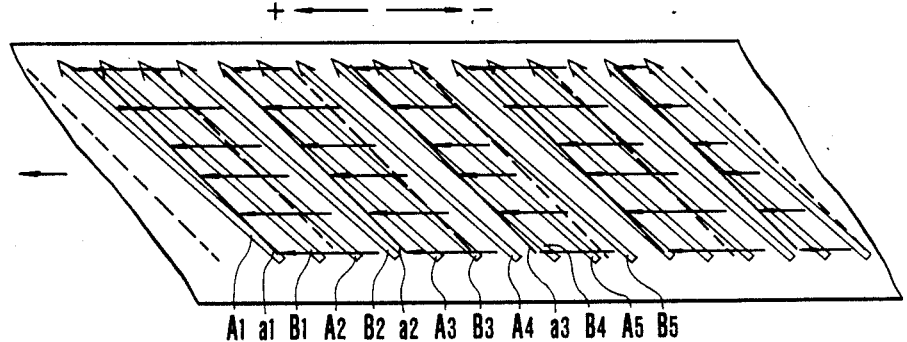

Referring to FIGS. 7(a)–7(g-3), 8(A) and 8(B), the pattern signal generating circuit 15a, which is arranged as described above, operates as follows: The count output of the lower place counter 128, that of the higher place counter 129, the composite output obtained from the outputs of the counters 128 and 129 (or the output of the D/A converter 123), and the output of the adder 24 are as shown by FIGS. 7(d-1)–7(g-1), respectively, in the event of reproduction at a speed increased by 1.5 times; as shown by FIGS. 7(d-2)–7(g-2), respectively, in the event of reproduction at a speed increased by 3 times; and as shown by FIGS. 7(d-3)–7(g-3), respectively, in the event of reproduction at a speed increased by 6 times. Meanwhile, FIGS. 8(A) and 8(B) show the relation of the center loci of scanning performed by the heads 2A and 2B to the center loci of recording tracks on the tape 1 under the conditions of reproduction at a speed increased by 3 times and at a 0.6 times speed, respectively.

When the power supply of the apparatus is switched on or when the apparatus is set into the reproducing mode thereof, the flip-flop 27 is reset by the PUC pulse signal. The level of the output $\overline{Q}$ of the flip-flop 27 becomes high. By this high level output, the lower place counter 128 is kept in a reset state. Following that, the head motor 5 begins to rotate the heads 2A and 2B. With the heads thus rotating, when the signal HSW is produced as shown in FIG. 7(a), the timing signal generating circuit 21 produces a timing signal which is synchronized with the rise and fall of the signal HSW as shown in FIG. 7(b), in the same manner as in the case of the pattern signal generating circuit 15 of FIG. 2. Then, according to this timing signal, the still pattern signal generator 124 produces a still pattern signal, which is as shown in FIG. 7(c), and causes the heads 2A and 2B to be continuously shifted to an extent from 0 to $-1$ TP within the range of scanning for one field.

Meanwhile, with the timing signal produced from the timing signal generating circuit 21, the first part of the signal sets the flip-flop 127. The level of the output $\overline{Q}$ of the flip-flop 127 becomes low to release the lower place counter 128 from its reset state. The counter 128 then counts the pulses of the capstan FG signal which is produced from the frequency signal generator 12, accordingly, as the capstan 10 rotates. The higher place counter 129 is then reset every time the timing signal is produced. As mentioned in the foregoing, the lower counter 128 produces the OF signal and reset by itself, or returns to zero, at a point of time when 2 TP portions of the capstan FG signal has been received. Therefore, the count output of the lower place counter 128 is as shown in FIG. 7(d-1) in the event of 1.5 times speed reproduction; is as shown in FIG. 7(d-2) in the event of 3 times speed reproduction; and is as shown in FIG. 7(d-3) in the event of 0.6 times speed reproduction. Then, the count output of the higher place counter 129, which counts the OF signal produced from the lower place counter 128, is as shown in FIG. 7(e-1) in the event of 1.5 times speed reproduction; is as shown in FIG. 7(e-2) in the event of 3 times speed reproduction; and is as shown in FIG. 7(e-3) in the event of 0.6 times speed reproduction. Accordingly, the composite count output of these counters 128 and 129, that is, the output of the D/A converter 123 is as shown in FIG. 7(f-1) in the event of 1.5 times speed reproduction; is as shown in FIG. 7(f-2) in the event of 3 times speed reproduction; and is as shown in FIG. 7(f-3) in the event of 0.6 times speed reproduction. The adder 25 adds up the output of the D/A converter 123 and that of the still pattern signal generator 124. As a result of this addition, the adder 25 produces a pattern signal which is as shown in FIG. 7(g-1) in the event of 1.5 times speed reproduction; is as shown in FIG. 7(g-2) in the event of 3 times speed reproduction; and is as shown in FIG. 7(g-3) in the event of 0.6 times speed reproduction. Further, since the outputs of the counters 128 and 129, the composite output of the counters 128 and 129 and the output of the adder 25 are obtained with the capstan FG signal counted by the counter 128, in actuality, these outputs include small stepwise variations. However, for the sake of simplification of illustration, these small stepwise variations are omitted from the drawing in the same manner as in the case of FIGS. 3(a)–3(g).

The pattern signal, which is obtained at the time of 1.5 times speed reproduction as shown in FIG. 7(g-1), is similar to the pattern signal of FIG. 3(g). Therefore, it is apparent that the pattern signal is sufficiently capable of shifting the heads 2A and 2B in a manner as required for 1.5 times speed reproduction.

Figure 4A:
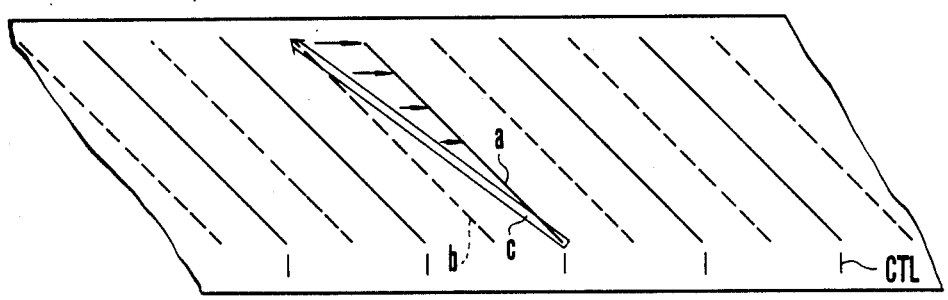
FIGS. 4(A) and 4(B) show, respectively, the relation between the recording tracks formed on a tape and scanning performed by rotating heads obtained in the events of still picture reproduction and reproduction at a speed increased by 1.5 times.
Figure 4B:
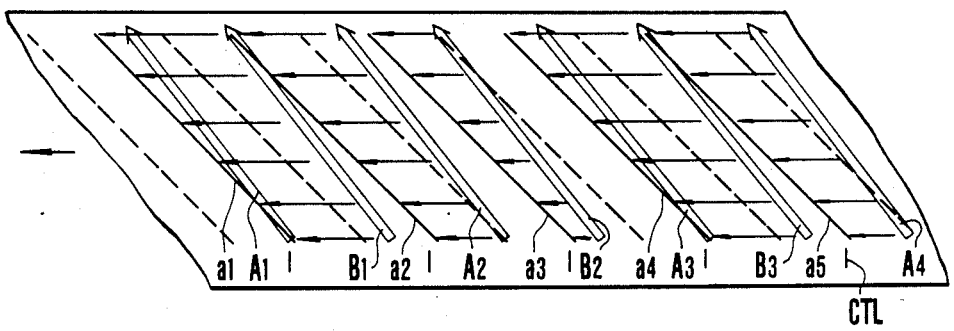
Figure 5A:
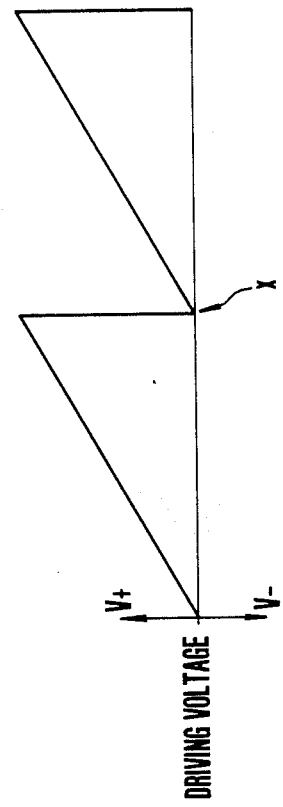
FIGS. 5(a) and 5(b) show the relation of a driving voltage impressed on shifting means to the actual displacement attained thereby.
Figure 5B:
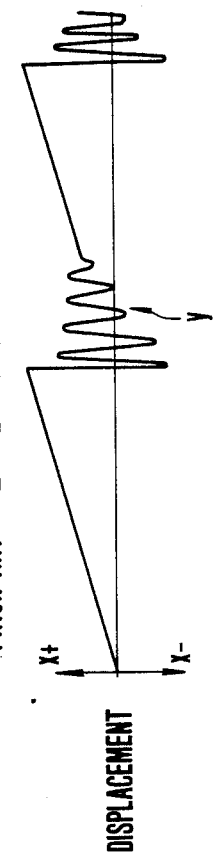

Meanwhile, referring to FIGS. 8(A) and 8(B), the conditions for shifting the heads in the events of reproduction at the 3 times and 0.6 times speeds are as follows: Referring first to FIG. 8(A), in the event of 3 times speed reproduction, the loci of the heads 2A and 2B relative to the track loci on the tape 1 are as shown in this drawing. The reference symbols A1, A2, A3, . . . , denote the loci of the head 2A; B1, B2, B3, . . . , those of the other head 2B; and a1, a2, a3, . . . , the track loci of field tracks recorded by recording heads of the same azimuth angle as that of the heads 2A and 2B, in the same manner as in the case of FIG. 4(B). (These loci are also shown in the same manner as in FIG. 8(B).) In a first field, the head 2A must be shifted continuously to an extent from 0 to $+2$ TP within the scanning range for the first field in order to adjust the head locus A1 to the track locus a1. In a second field, to adjust the head locus B1 to a next track locus a2, the head 2B must be shifted continuously to an extent from $+1$ TP to $+3$ TP within the scanning range for the second field. After that, these adjustment processes must be repeated in a cycle of two fields. It will be understood that the pattern signal, as represented by FIG. 7(g-2), is capable of meeting the above-stated requirement for shifting the heads 2A and 2B.

In the event of 0.6 times speed reproduction, the loci of the heads 2A and 2B relative to the track loci on the tape 1 are as shown in FIG. 8(B). In the first field, in order to adjust the head locus A1 to the track locus a1, the head 2A must be continuously shifted to an extent from 0 to $-0.4$ TP within the scanning range for the first field. In the second field, to adjust the head locus B1 to the track locus a1, the head 2B must be continuously shifted to an extent from $+0.6$ TP to $+0.2$ TP within the scanning range for the second field. In the third field, to adjust the head locus A2 to the track locus a1, the head 2A must be continuously shifted to an extent from $+1.2$ TP to $+0.8$ TP within the scanning range for the third field. In the fourth field, to adjust the head locus B2 to the track locus a1, the head 2B must be continuously shifted to an extent from $+1.8$ TP to $+1.4$ TP within the scanning range for the fourth field. In the fifth field, to adjust the head locus A3 to the track locus a2, the head 2A must be continuously shifted to an extent from $+0.4$ TP to 0 TP within the scanning range for the fifth field. In the sixth field, to adjust the head locus B3 to the track locus a2, the head 2B must be continuously shifted to an extent from $+1$ TP to $+0.6$ TP within the scanning range for the sixth field. In the seventh field, to adjust the head locus A4 to the track locus a2, the head 2A must be continuously shifted to an extent from $+1.6$ TP to $+1.2$ TP within the scanning range for the seventh field. In the eighth field, to adjust the head locus B4 to the track locus a3, the head 2B must be continuously shifted to an extent from $+0.2$ TP to $-0.2$ TP within the scanning range for the eighth field. In the ninth field, to adjust the head locus A5 to the track locus a3, the head 2A must be continuously shifted to an extent from $+0.8$ TP to $+0.4$ TP within the scanning range for the ninth field. In the tenth field, to adjust the head locus B5 to the track locus a3, the head 2B must be continuously shifted to an extent from +1.4 TP to +1 TP within the scanning range for the tenth field. After that, these adjustment processes are repeated in a cycle of the above-stated ten fields. The pattern signal, which is represented by FIG. 7(g-3), is capable of meeting the head shifting requirement described.

In the arrangement of the embodiment of the invention as has been described in the foregoing, the counters 128 and 129 form counting means for counting the pulses of a first pulse signal of the capstan FG signal, which is obtained in association with the tape moving operation of the capstan 10 which serves as tape moving means. The timing signal generating circuit 21 forms control means which operates according to a second pulse signal, i.e. at the timing of the signal HSW obtained in association with the rotation of the heads 2A and 2B to clear the datum of the bit of a higher place exceeding a bit corresponding to a predetermined number n determined in accordance with the arrangement of recording tracks on the tape 1, that is, a bit corresponding to the number of pulses of the capstan signal representing two track pitches, or, in short, operates to clear the content of the higher place counter 129. The D/A converter 123 serves as control signal forming means for forming, on the basis of the count output of the above-stated counting means, a control signal for the electrical-to-mechanical conversion elements 3A and 3B which serve as head shifting means.

In a variation on the embodiment described, the use of the counters 128 and 129 may be replaced; for example, with a microcomputer or the like. In that instance, an internal counter of the microcomputer is arranged to count the pulses of the capstan FG signal. The counter is controlled by a predetermined program in such a manner that the datum of a bit higher than a bit corresponding to a count value of the internal counter, which corresponds to 2 TP, is cleared at a point of time when the timing signal is produced from the timing signal generating circuit 21. In an alternative to this, the number of pulses of the capstan FG signal corresponding to 2 TP is repeatedly subtracted from the contents of the internal counter until the contents becomes less than a count value corresponding to 2 TP only in case where the count value is in excess of the value corresponding to 2 TP at a point of time when the timing signal is produced. In either case, a pattern signal represented by FIGS. 7(f-1), 7(f-2) or 7(f-3) is obtainable directly from the internal counter.

Figure 2:
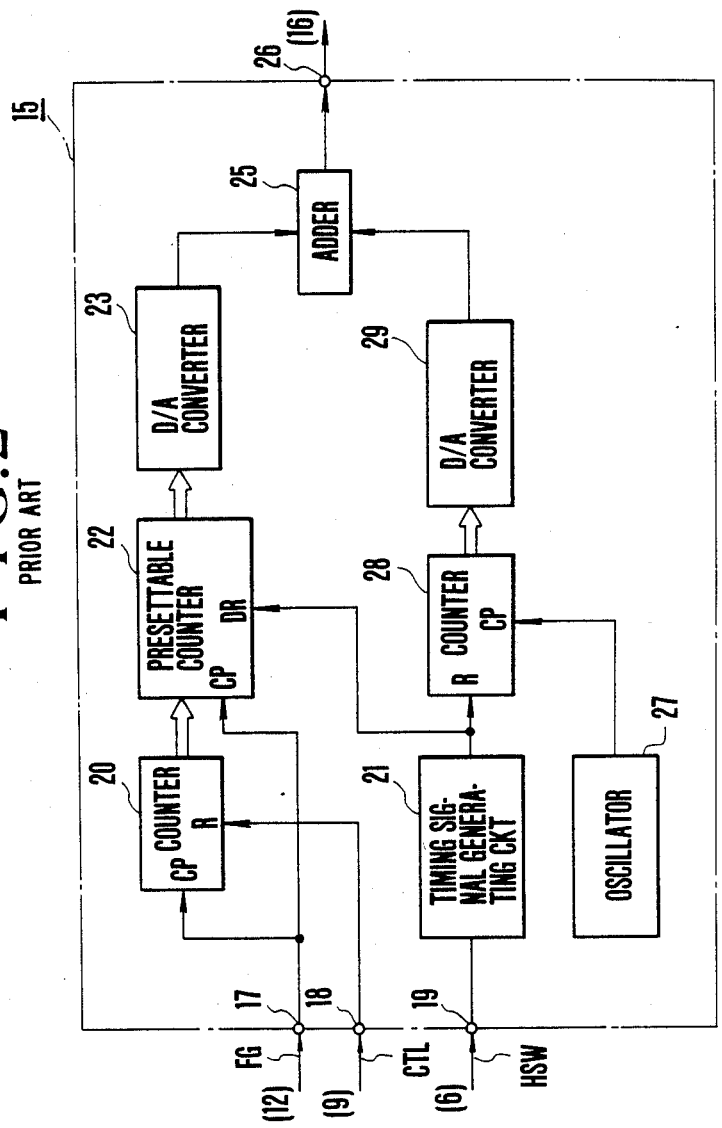
FIG. 2 is a block diagram showing, by way of example, a pattern signal generating circuit of the VTR of FIG. 1.
Figure 9:
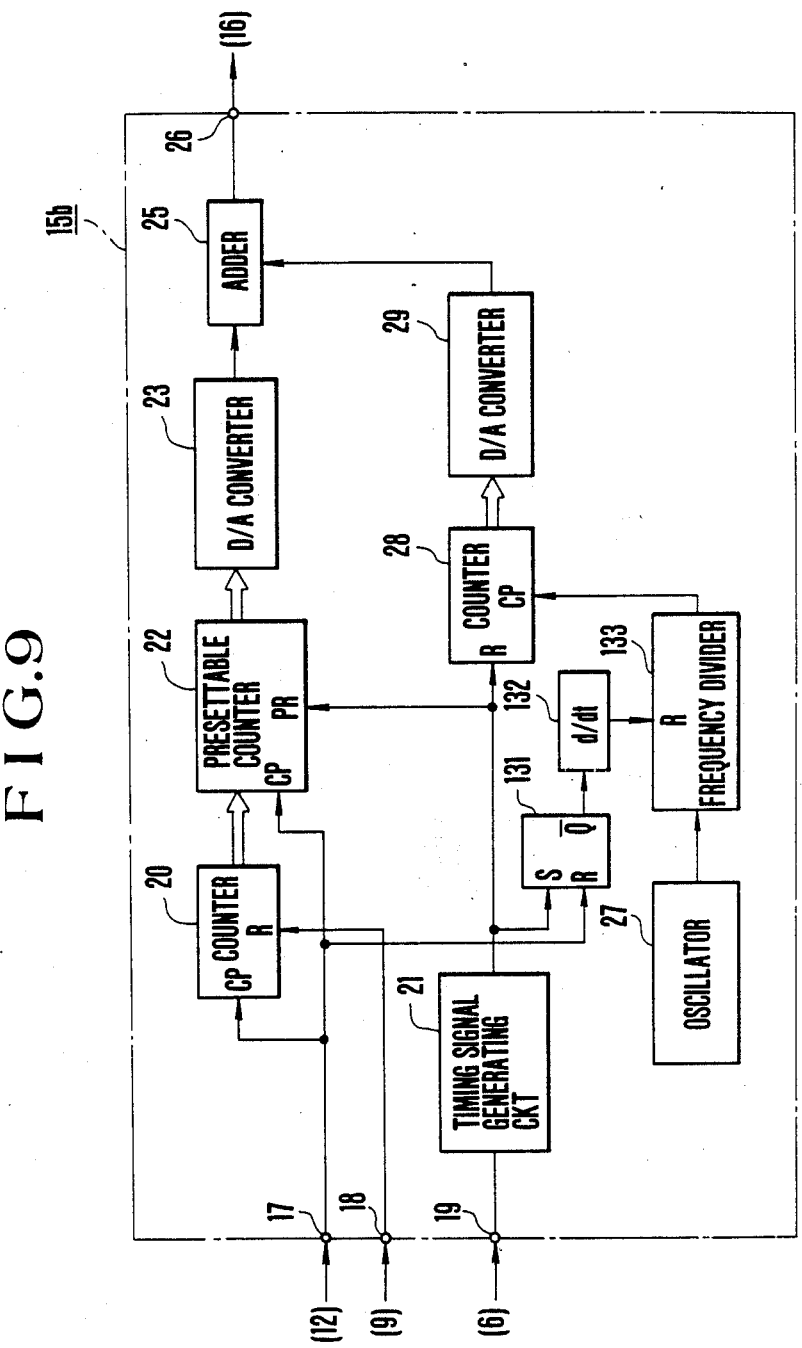
FIG. 9 is a block diagram showing an arrangement of a pattern signal generating circuit of a VTR arranged as another embodiment of the invention.

Reverse reproduction has been omitted from the description of the embodiment example given above. However, in the event of reverse reproduction, the output of the D/A converter 123 is inverted and, after that, the inverted output is added to the output of the still pattern signal generator 124. Further, tracking can be improved in elaborateness by forming an automatic tracking signal (hereinafter called an ATF signal) on the basis of the reproduction outputs of the heads 2A and 2B in a known manner and by adding the ATF signal to the output of the adder 25. Another embodiment of the invention, which is capable of solving one of the problems of the prior art, is arranged as described below:

FIG. 9 is a block diagram showing the arrangement of essential parts of a VTR arranged as another embodiment of the invention. In FIG. 9, the components and parts that are the same as those shown in FIG. 2 are indicated by the same reference numerals and are omitted from the following description. The embodiment includes an R-S flip-flop 131, a differentiation circuit 132, and a frequency divider 133. The frequency dividing ratio of the frequency divider 133 is so arranged that the frequency of the capstan FG signal counted by the counter 22 and that of the clock pulses counted by the counter 28 are close to each other. For example, the frequency dividing ratio is arranged to have the frequency of the capstan FG signal under a normal reproducing operation coincide with the output frequency of the frequency divider 133. The purpose of this arrangement is to make the above-stated phase deviation of the D/A converter 23 and that of the D/A converter 29 approximately equal to each other. The operation of the embodiment is as follows:

The presettable counter 22 and the counter 28 are arranged to be reset by the output of the timing signal generating circuit 21. At that time, there is an input to the terminal S of the flip-flop 131 to cause the level of the output $\bar{Q}$ of the flip-flop 131 to change from a high level to a low level. Then, immediately after this, the capstan FG signal changes the output $\bar{Q}$ of the flip-flop 131 from the low level to a high level. The output of the differentation circuit 132 then resets the frequency divider 133. In other words, the capstan FG signal and the output of the frequency divider 133 are concurrently obtained immediately after the timing signal is generated, so that phase adjustment for these outputs can be accomplished approximately according to the generation cycle of the timing signal. This arrangement causes the phase of the pattern signal obtained from the D/A converter 23 and that of the pattern signal obtained from the D/A converter 29 to coincide with each other. Therefore, with these pattern signals added up, there is produced no meaningless portion in the waveform. Accordingly, the operation of the electromechanical conversion elements, which are employed as shifting means, is not wasted, so that tracking can be satisfactorily carried out.

Figure 10:
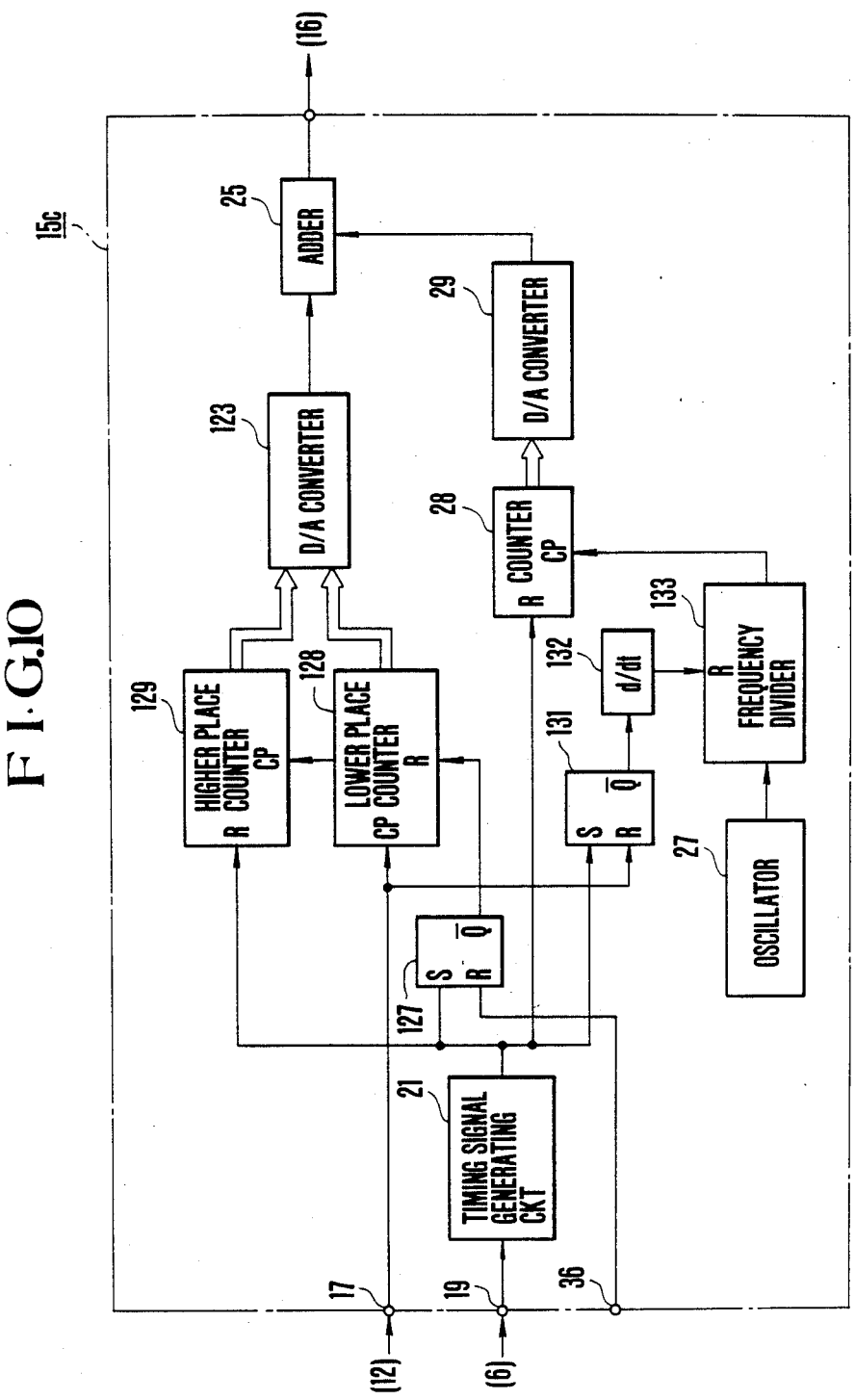
FIG. 10 is a block diagram showing a pattern signal generating circuit of a VTR arranged as a further embodiment of the invention.

The following description deals with a further example of embodiment of the invention in which the concept described above is applied to a VTR which does not use a CTL signal: This embodiment is arranged as shown in FIG. 10, in which the components and parts the same as those shown in FIG. 6 or 9 are indicated by the same reference numerals. FIG. 10 shows an arrangement of a pattern signal generating circuit which is usable in place of the pattern signal generating circuit 15 of FIG. 1. In the drawing, the whole pattern signal generating circuit is indicated by a reference numeral 15c. Referring to FIGS. 7, 8(A) and 8(B), this pattern signal generating circuit 15c operates as follows:

The timing signal produced from the timing signal generating circuit 21 is supplied also to the terminal S of the flip-flop 131. With the timing signal supplied to the terminal S, the output level of the terminal $\bar{Q}$ of the flip-flop 131 changes from a high level to a low level. When the capstan FG signal, produced immediately after that, is supplied to the terminal R of the flip-flop 131, the output of the terminal $\bar{Q}$ changes from the low level to a high level. With the output level of the terminal $\bar{Q}$ of the flip-flop 131 becoming high, the frequency divider 133 is reset by the output of the differentiation circuit 132. At this point of time, the clock pulses produced from the frequency divider 133 become inphase with the capstan FG signal without fail. The clock pulses produced from the frequency divider 133 are counted by the counter 28 and the counter 28 is reset by the timing signal. By this, a still pattern signal, which is inphase with the fixed pattern signal produced from the D/A converter 123, can be obtained. As represented by FIG. 7(c), this still pattern signal is obtained for the purpose of continuously shifting the heads 2A and 2B to an extent from 0 to −1 TP within the scanning range for one field. The adder 25 adds the output of the D/A converter 123 to tht of the D/A converter 29. As a result of addition, the adder 24 produces a pattern signal which is as shown in FIG. 7(g-1) in the event of 1.5 times speed reproduction; is as shown in FIG. 7(g-2) in the event of 3 times speed reproduction; and is as shown in FIG. 7(g-3) in the event of 0.6 times speed reproduction.

As described above, in the case of the embodiment wherein the invention is applied to a VTR which does not use a CTL signal, the phase of a first pattern signal, obtained by counting the capstan FG signal, and that of a second pattern signal, obtained by counting frequency divided clock pulses, can be made to coincide with each other. With these signals computed, therefore, no meaningless portion will be produced in the waveform.

Figure 11:
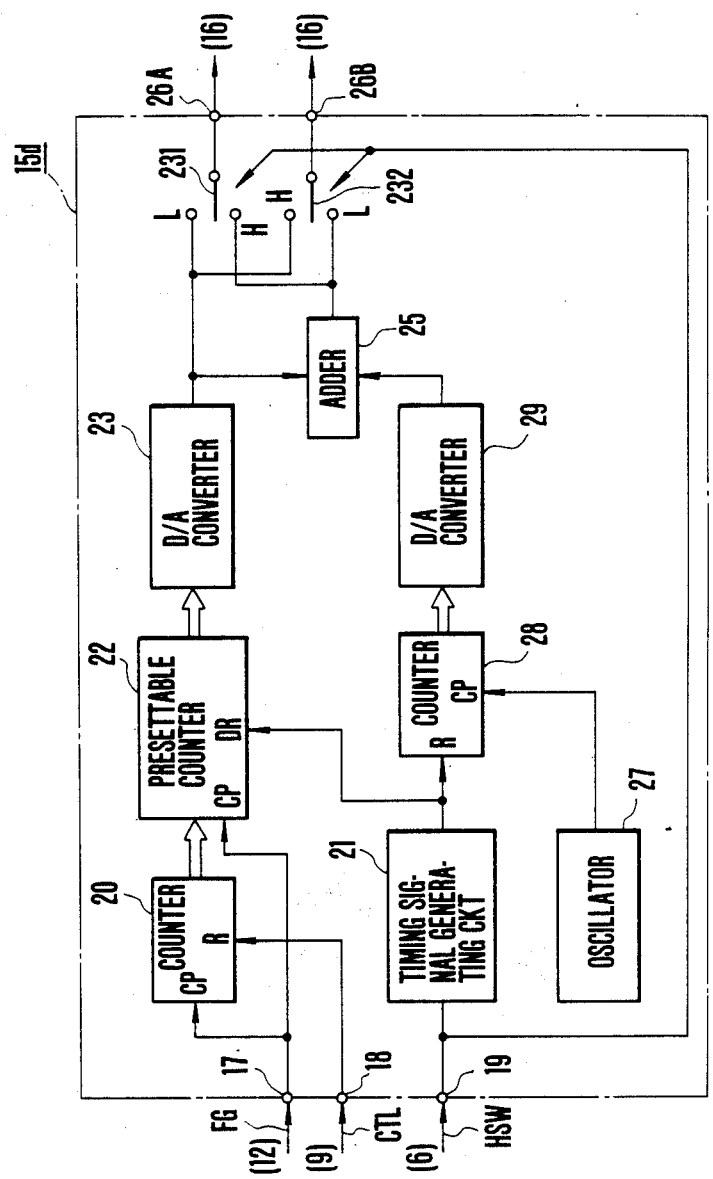
FIG. 11 is a block diagram showing a pattern signal generating circuit of a VTR arranged as a further embodiment of the invention.
Figure 12:
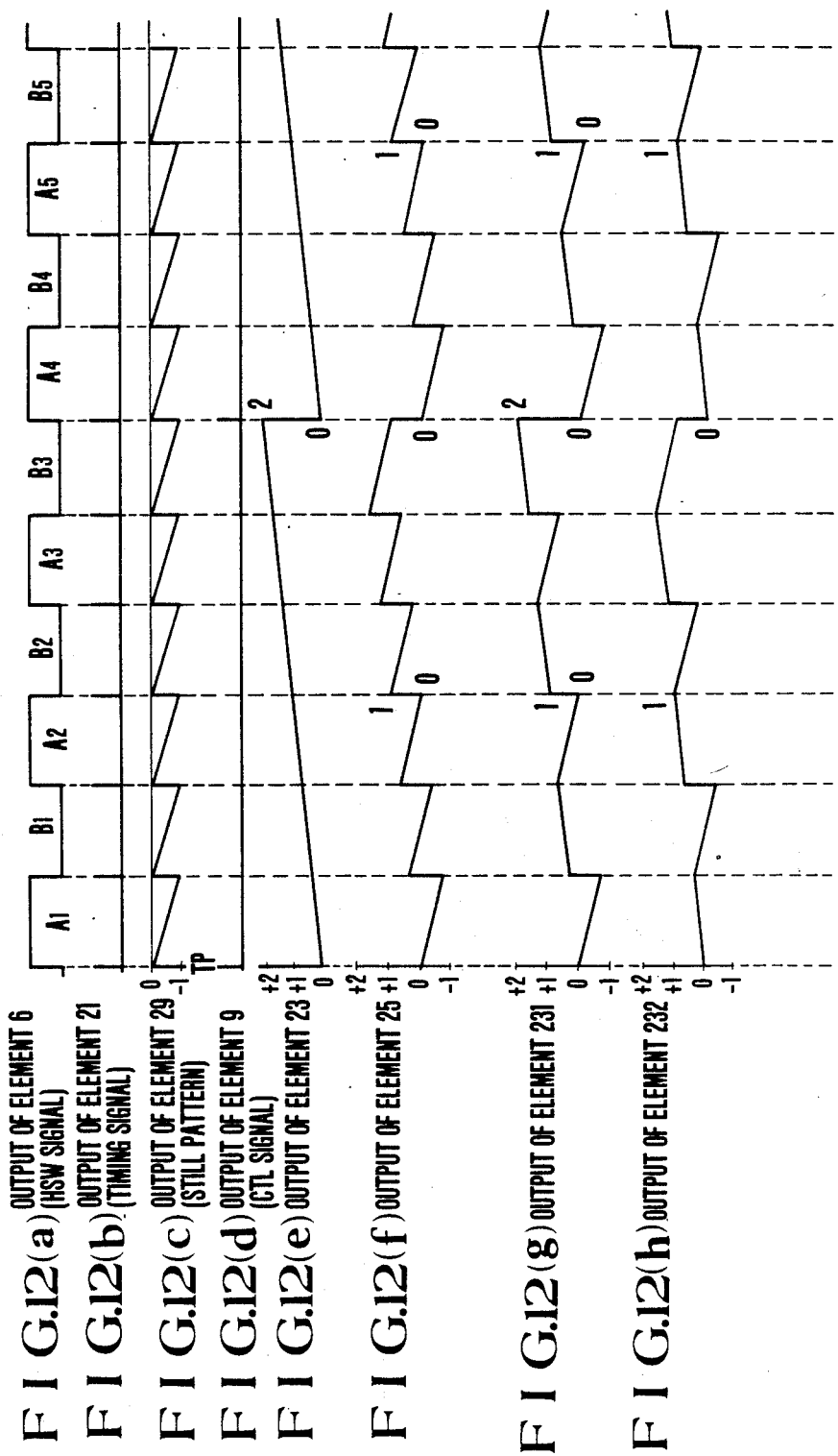
FIGS. 12(a) to 12(h) show the waveforms of outputs produced from various parts of FIG. 11.

FIG. 11 shows, in a block diagram, the essential parts of a VTR arranged according to the invention as another embodiment. The components and parts the same as those shown in FIG. 2 are indicated by the same reference numerals and are omitted from description here. The embodiment includes analog switches 231 and 232. The HSW signal is supplied to each control terminal. The outputs of these analog switches 231 and 232 are arranged to be supplied to the conversion element driving circuit via terminals 26A and 26B and to be used for driving the conversion elements 3A and 3B.

With the embodiment arranged as shown in FIG. 11, a pattern signal is obtained as necessary, i.e. only when the heads 2A and 2B are in reproducing operation, by applying the above-stated still pattern signal. This arrangement prevents a sudden rise of the shifting means driving pattern signal which takes place in response to a sudden rise of the still pattern signal generated immediately before each field. FIGS. 12(a)-12(h) are timing charts showing the waveforms of outputs of various parts of FIG. 11 obtained in the event of a ⅓ times speed slow reproducing operation. The shifting means is driven by the waveforms of FIGS. 12(g) and 12(h). However, during a period indicated by A1, A2, A3, . . . , reproduction is performed by the head 2A. During a period indicated by B1, B2, B3, . . . , the head 2B performs reproduction. Therefore, the time at which the shifting means carrying the heads during the reproducing operation is controllable with the pattern signal obtained immediately after a sudden rise or fall thereof is only during the transient period from B3 to A4 as shown in the timing charts of FIGS. 12(a)-12(h). Therefore, compared with the arrangement for controlling the shifting means with a pattern signal such as the one represented by FIG. 12(f), the possibility of unstable control due to ringing of the shifting means is lessened to a great extent thereby ensuring satisfactory tracking control over the heads. Besides, the circuit arrangement is very simple as it requires the addition of only two analog switches to the circuit arrangement of FIG. 2.

Figure 13:
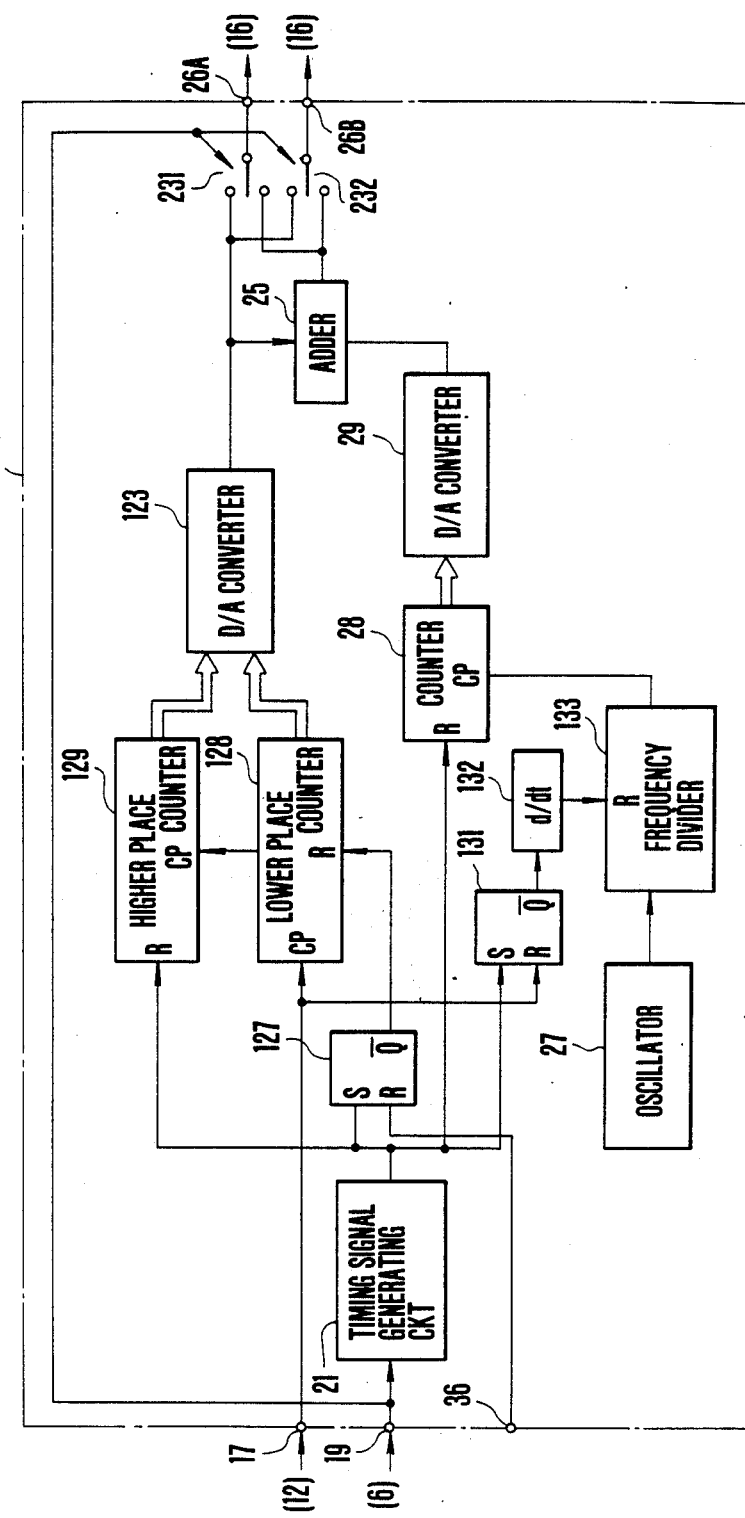
FIG. 13 is a block diagram showing a pattern signal generating circuit of a VTR arranged as a further embodiment of the invention.
Figure 14:
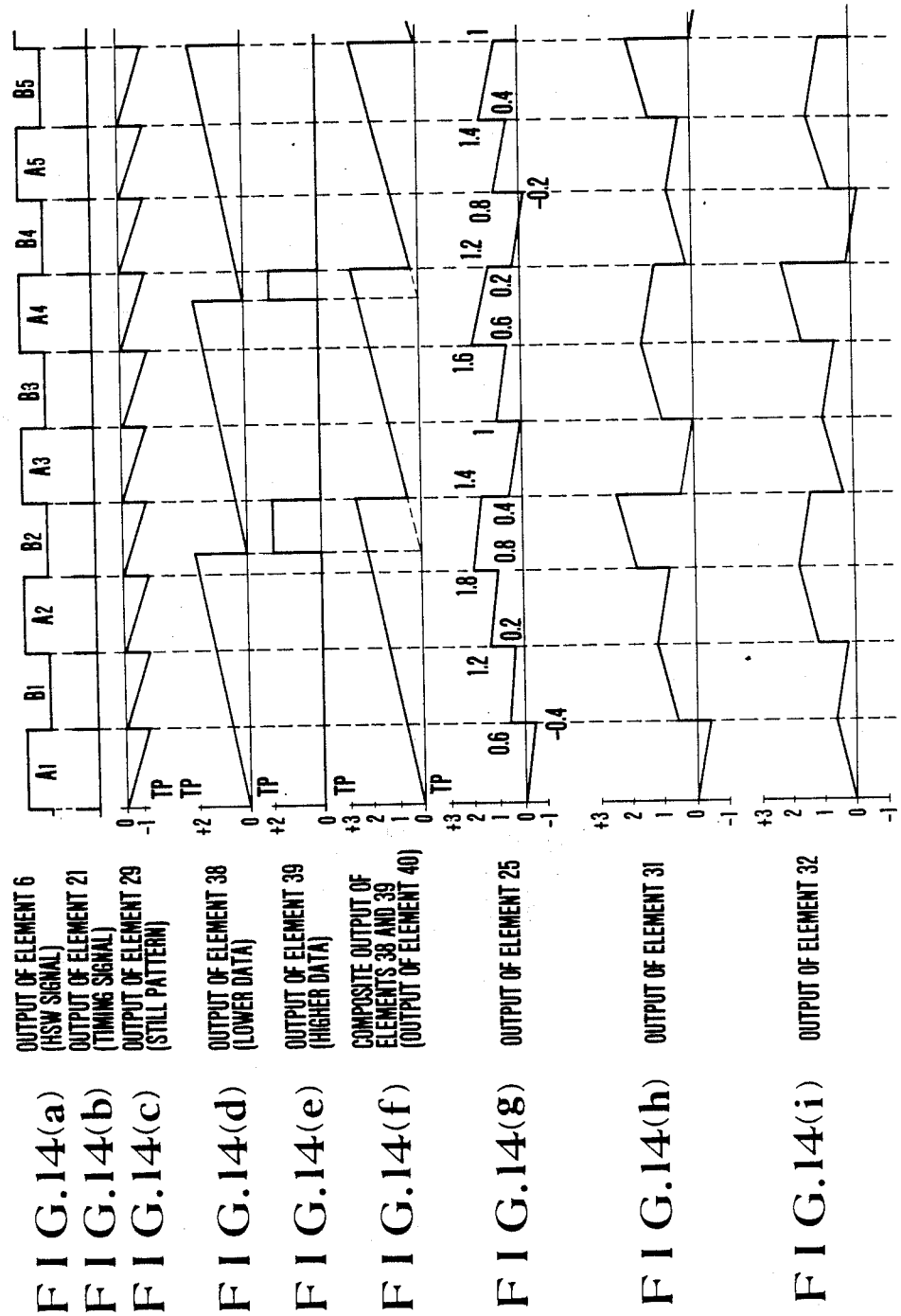
FIGS. 14(a) to 14(i) show the waveforms of outputs produced from various parts of FIG. 13.

The following description further deals with embodiments of the invention in which the above-stated concept is applied to VTR's which do not usa a CTL signal:

FIG. 13 shows the arrangement of essential parts of a VTR arranged according to the invention as a further embodiment thereof. In FIG. 13, parts the same as those shown in FIGS. 10 and 11 are indicated by the same reference numerals and are omitted from description here. What is shown in FIG. 13 is a pattern signal generating circuit usable in place of the pattern signal generating circuit of FIG. 1. In this case, the whole pattern signal generating circuit is indicated by a reference numeral 15e. Referring now to FIGS. 14(a)-14(i), the pattern signal generating circuit 15e operates as described below:

FIGS. 14(a)-14(i) are timing charts showing waveforms obtained in the event of 0.6 times speed reproduction. A pattern signal which is obtained as represented by FIG. 14(g) meets the requirement for shifting the heads 2A and 2B as mentioned in the foregoing. This pattern signal does not have to be used for controlling the head 2A during a period corresponding to B1, B2, . . . , of FIGS. 14(a)-14(i) and also does not have to be used for controlling the other head 2B during a period corresponding to A1, A2, . . . , of FIG. 14(a)-14(i), as mentioned in the foregoing. Therefore, switches 231 and 232 operate in the same manner as the corresponding switches of the preceding embodiment shown in FIG. 11. In other words, they operate to give pattern signals for the heads 2A and 2B, as represented by FIGS. 14(h) and 14(i), by applying the still pattern signal only when these heads are in reproducing operation. Therefore, with the invention applied to a VTR not using a CTL signal as shown in FIG. 13, the ringing of the shifting means can be very simply suppressed. The advantageous effect of this embodiment is conspicuous particularly in the event of slow motion reproduction.

Figure 15:
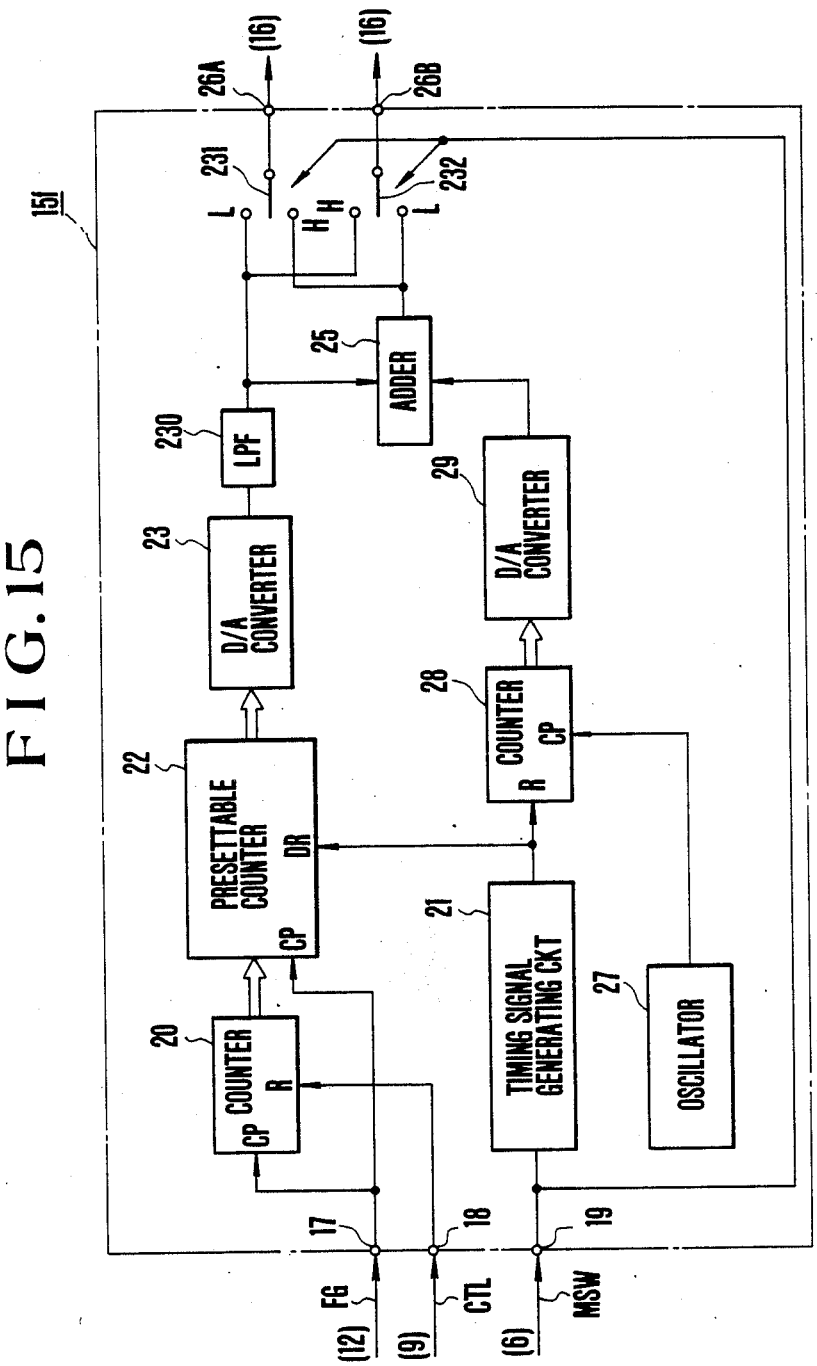
FIG. 15 is a block diagram showing a pattern signal generating circuit of a VTR arranged as a further embodiment of the invention.
Figure 16:
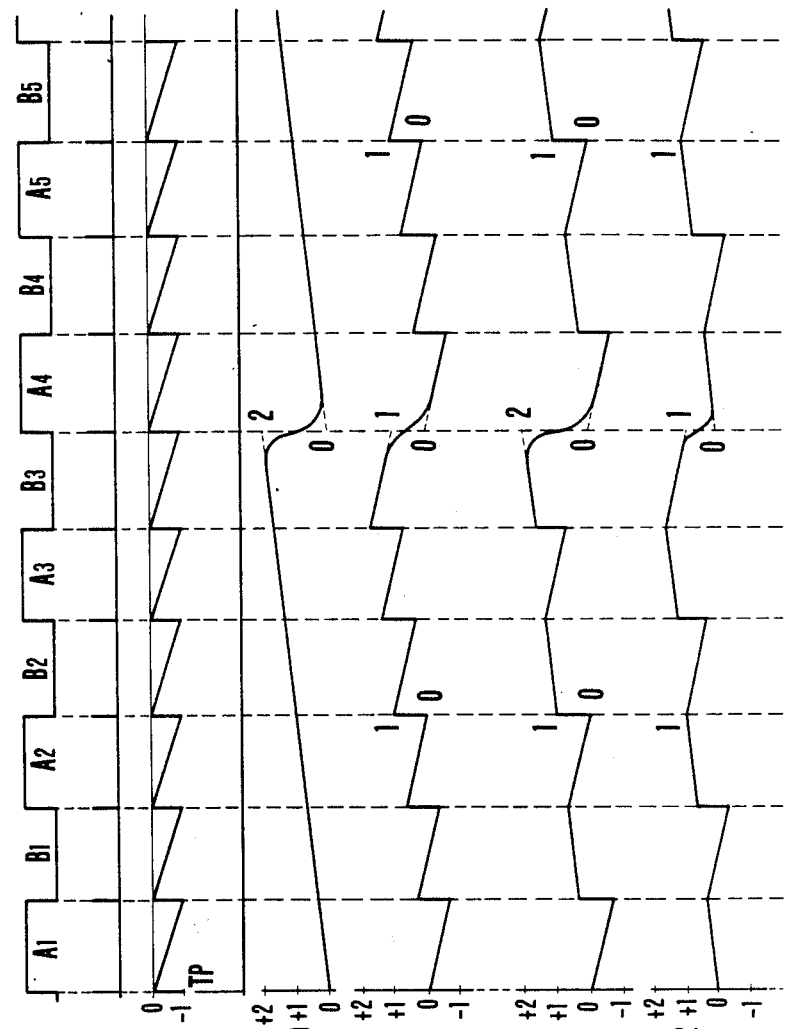
FIGS. 16(a) to 16(h) show the output waveforms of various parts shown in FIG. 15.

FIG. 15 shows another pattern signal generating circuit 15f arranged for a VTR as a further embodiment of the invention. In FIG. 15, parts the same as those shown in FIG. 11 are indicated by the same reference numerals and are omitted from description here.

In this case, a signal obtained by adding the above-stated still pattern signal to the output of an LPF 230 is used only for the shifting means shifting the head which is in reproducing operation. Meanwhile, the output signal of the LPF 230 is used for the shifting means shifting the head which is not in reproducing operation. The pattern signals for these heads are obtained in this manner. This arrangement prevents the shifting means driving pattern signal rom suddenly rising in response to a sudden rise of the still pattern signal immediately before each field. As for the above-stated fall of the first pattern signal (or the output of the presettable counter 22), the fall is modified by virtue of the LPF 230. FIGS. 16(a)-16(h) are timing charts showing the output waveforms of various parts of FIG. 15. In this embodiment, the shifting means is actually driven with the waveforms represented by full lines of FIGS. 16(g) and 16(h). During periods indicated by A1, A2, A3, . . . , reproduction is performed by the head 2B. Meanwhile, the head 3A performs reproduction during periods indicated by B1, B2, B3, . . . . As shown, therefore, the arrangement of this embodiment completely precludes the possibility that the shifting means carrying the head which is in reproducing operation is controlled by a pattern signal obtained immediately after a sudden rise or fall thereof. Further, waveforms indicated by broken lines at FIGS. 16(e), 16(f), 16(g) and 16(h) represent waveforms obtained without the LPF 230.

The arrangement of this embodiment thus permits satisfactory tracking control of the heads as it obviates the fear of unstable control due to ringing of the shifting means. Besides, the circuit of the embodiment can be arranged in a very simple manner because it is obtainable by just adding two analog switches and an LPF to the circuit arrangement of FIG. 2.

Figure 17:
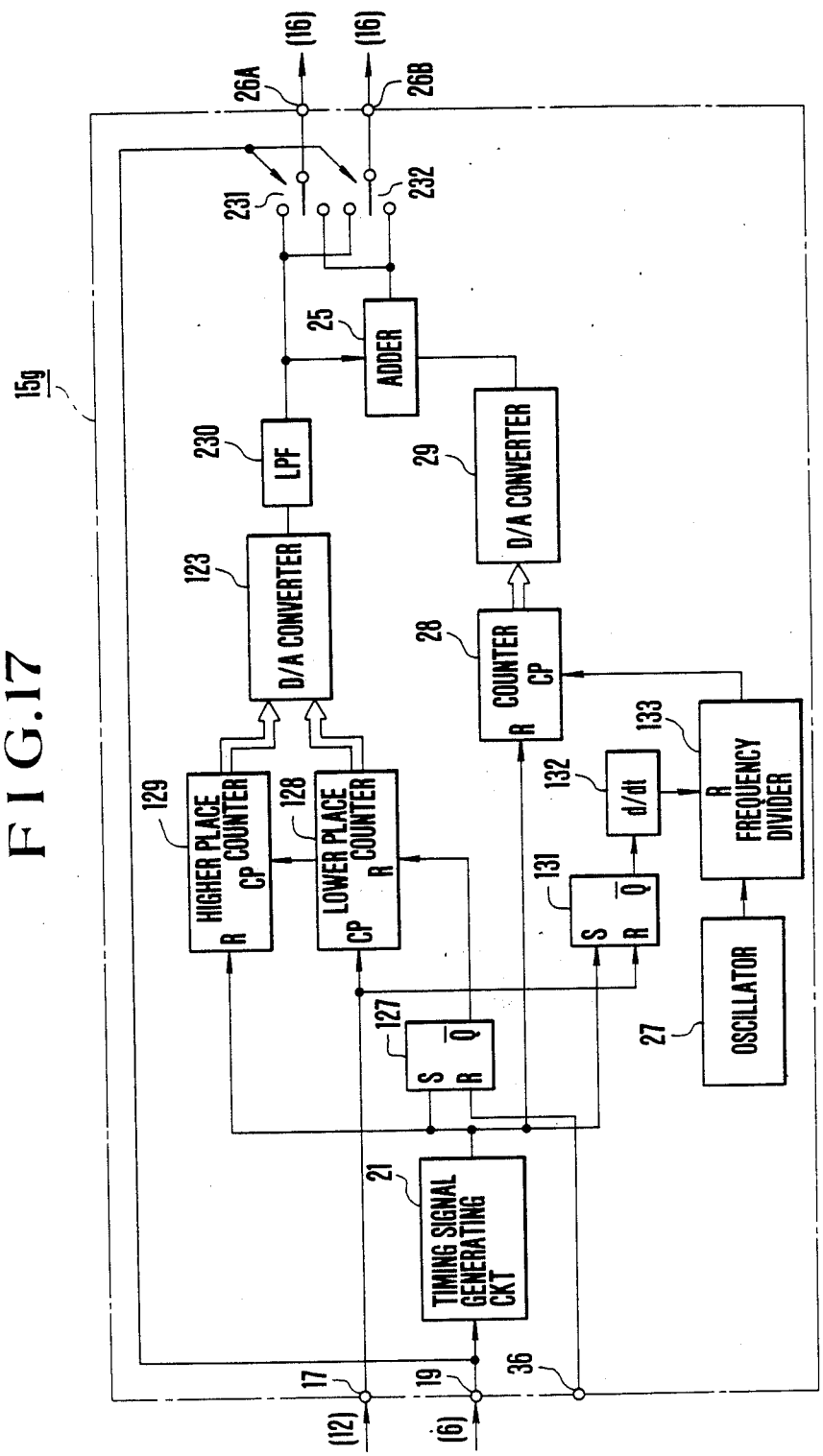
FIG. 17 is a block diagram showing a pattern signal generating circuit of a VTR arranged as another embodiment of the invention.

FIG. 17 shows another pattern signal generating circuit 15a arranged according to the above-stated concept as another embodiment of the invention for a VTR using no CTL signal. In FIG. 17, parts the same as those shown in FIGS. 13 and 15 are indicated by the same reference numerals and are omitted from description here. FIGS. 18(a)–18(i) are timing charts showing the operation of the circuit arrangement of FIG. 17.

Figure 18:
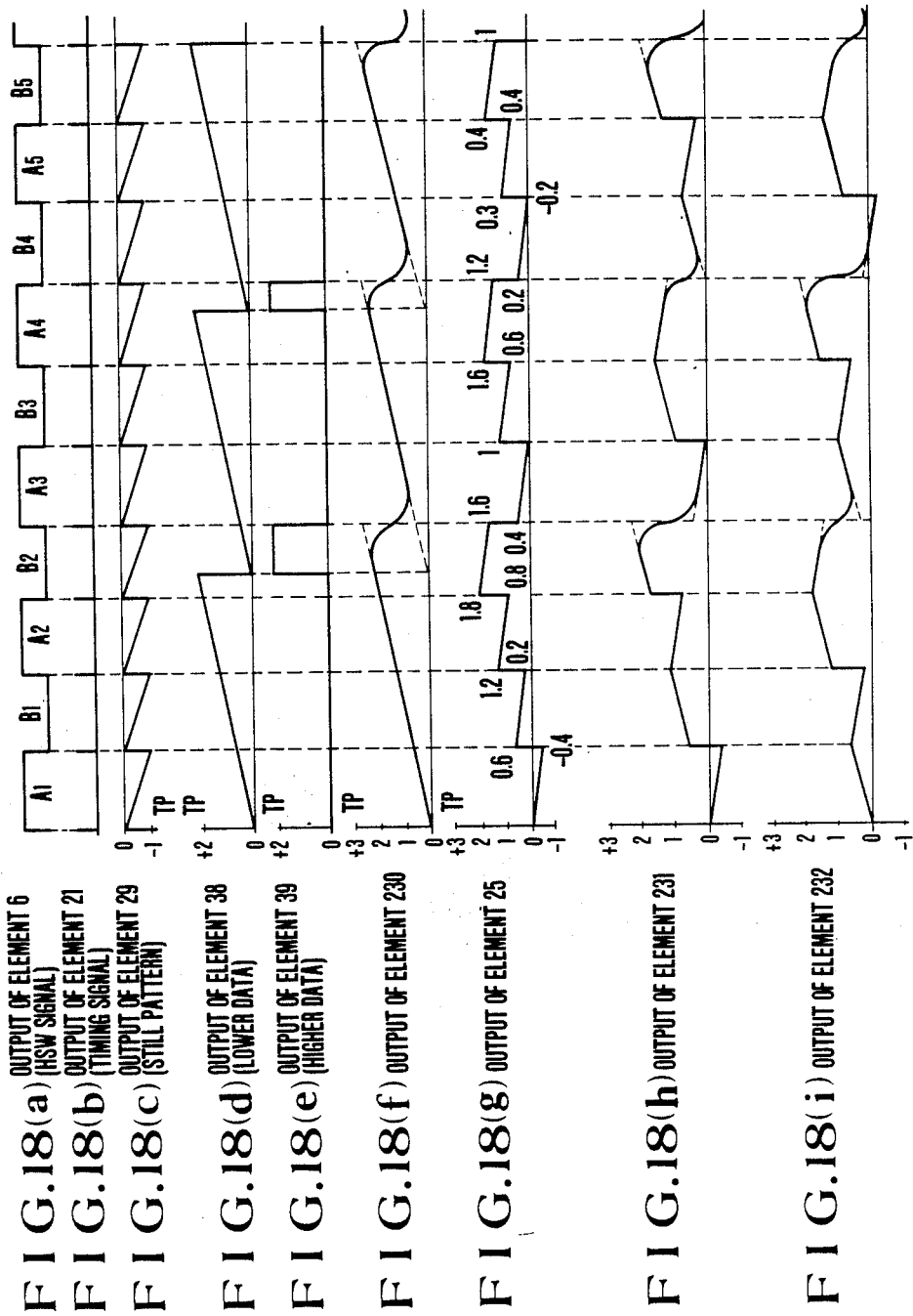
FIGS. 18(a) to 18(i) show the output waveforms of various parts shown in FIG. 17.

In the embodiment shown in FIG. 17, a composite output obtained from a higher place counter 129 and a lower place counter 128 (or the output of a D/A converter 123) is as represented by a broken line in FIG. 18(f). The output of the LPF 230 is as represented by a full line in FIG. 18(f). The output of the LPF 230 and the output of the D/A converter 29 are added and the adder 25 produces a signal which is as represented by a full line in FIG. 18(g).

Thus, even in the case of a VTR not using a CTL signal, the arrangement of the embodiment described above is capable of suppressing unstable control due to ringing of the shifting means without recourse to complex circuitry.

Figure 19:
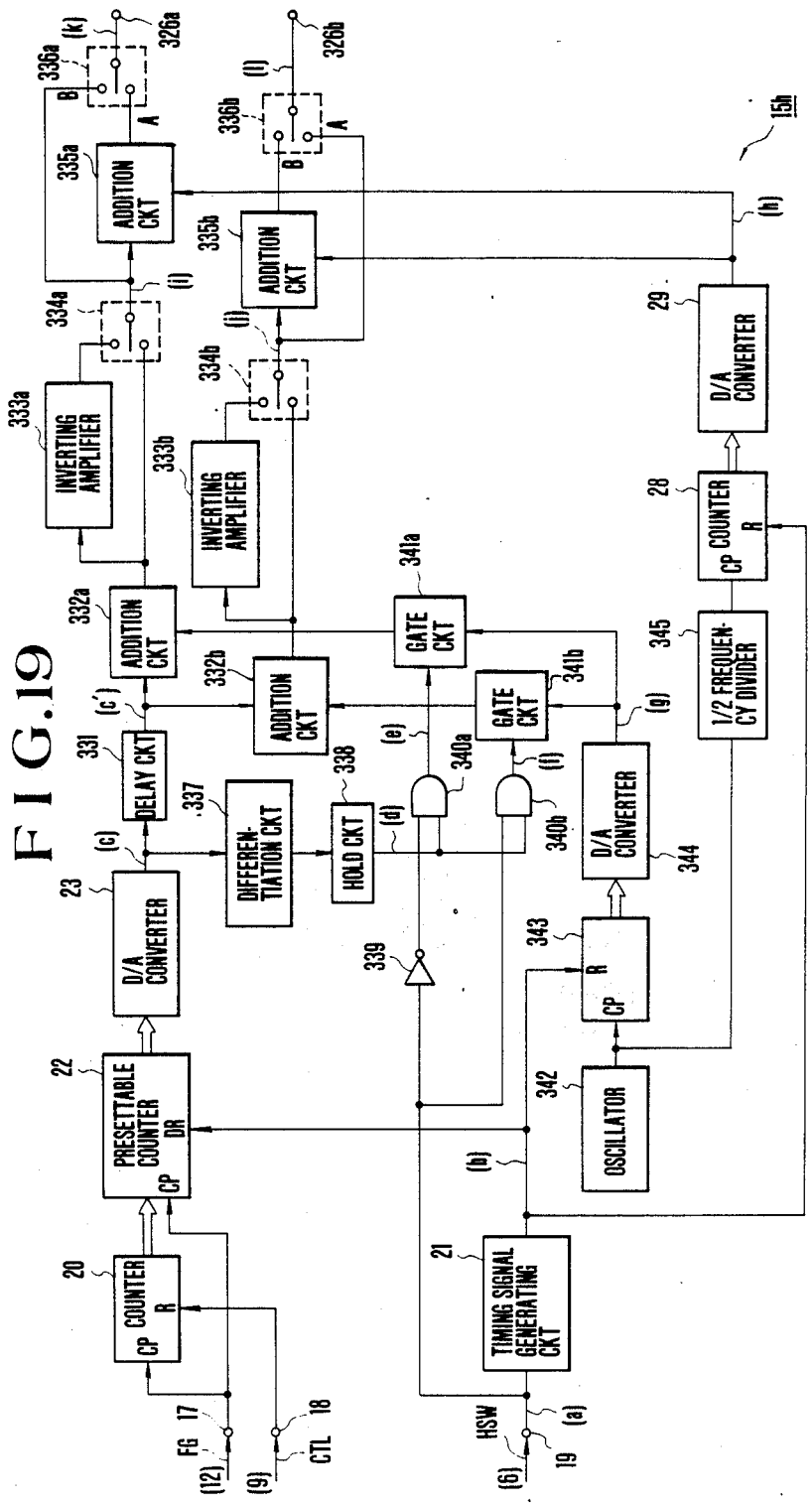
FIG. 19 is a block diagram showing a pattern signal generating circuit of a VTR arranged as a further embodiment of the invention.
Figure 20:
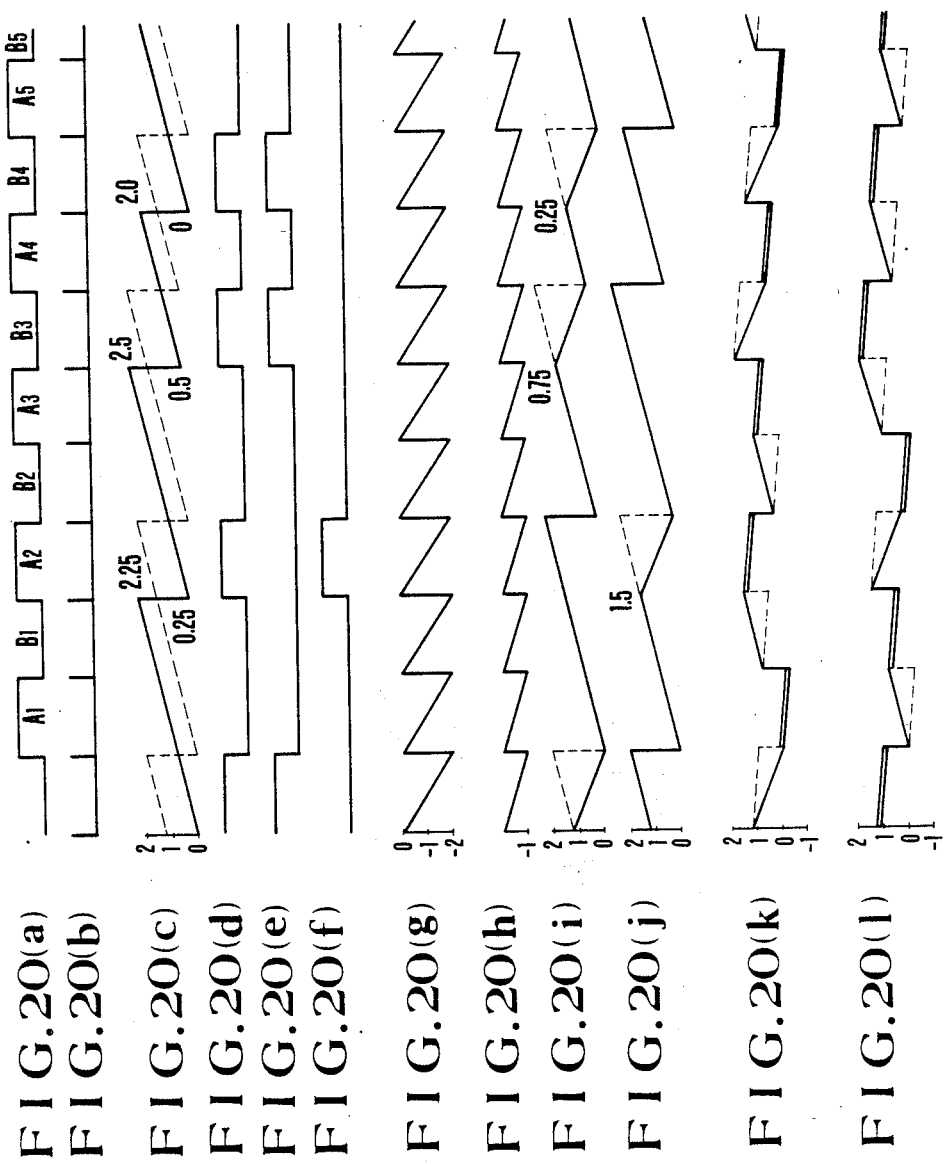
FIGS. 20(a) to 20(l) show the output waveforms of various parts shown in FIG. 19.

FIG. 19 is a block diagram showing essential parts of a pattern signal generating circuit 15h of a VTR arranged according to the invention as a further embodiment thereof. In FIG. 19, parts the same as those shown in FIG. 2 are indicated by the same reference numerals and are omitted from description here. This embodiment includes a one-field-period delay circuit 331, addition circuits 332a and 332b, inverting amplifiers 333a and 333b, analog switches 334a and 334b, addition circuits 335a and 335b, analog switches 336a and 336b, a differentiation circuit 337b, a one-field-period holding circuit 338, an inverter 339, AND gates 340a and 340b, gate circuits 341a and 341b, an oscillator 342, a counter 343, a D/A converter 344, and a ½ frequency divider 345.

FIGS. 20(a)–20(l) are timing charts showing the output waveforms at points (a)–(l) in FIG. 19. The operation of the embodiment shown in FIG. 19 will be described with reference to these drawings as follows: The timing chart waveforms of FIGS. 20(a)–20(l) are obtained in the event of ¾ times speed reproduction. The D/A converters 23 and 29, respectively, produce first and second pattern signals, as represented by a full line of FIG. 20(c) and FIG. 20(h) in the same manner as in the case of the circuit arrangement shown in FIG. 2. With these signals added up, a pattern signal corresponding to the distance between the recording track and the tracking locus of the head is obtained. The sudden rise and fall of this pattern signal correspond to a rise of the first pattern signal corresponding to 2 TP and a fall of the second pattern signal corresponding to 1 TP. Further, as mentioned in the foregoing, the pattern signal to be used for driving the shifting means shifting the head not in reproducing operation may be in any waveform. Therefore, if the rise or fall of the first and second pattern signals is compensated for, or corrected, during such non-reproducing periods, the head can be prevented from performing inadequate tracking during the reproducing operation due to ringing of the shifting means. This embodiment embodies that concept in a simple circuit arrangement.

The differentiation circuit 337 is arranged to detect a sudden rise or fall in the output waveform of the D/A converter 23, i.e. in the first pattern signal. The holding circuit 338 is triggered by a rise or fall of the output of the differentiation circuit 337 and holds the output at a high level for a period of one field. Meanwhile, the first pattern signal is delayed for the period of one field by the delay circuit 331 to become as indicated by a broken line in FIG. 20(c), before it is supplied to the addition circuits 332a and 332b. In this instance, the output of the one-field-period holding circuit 338, produced immediately before the rise or fall of the first pattern signal, is at a high level. Therefore, while the output of the holding circuit 338 is in its high level period and the heads 2A and 2B are not in reproducing operation, a compensating pattern signal, which compensates for a sudden level change of the first pattern signal produced for the purpose of driving the conversion elements 3A and 3B, is added by the addition circuits 332a and 332b. The AND gates 340a and 340b then produce signals which indicate this period by their high levels as represented by FIGS. 20(e) and 20(f). During this period, the compensating pattern signal, which is produced from the D/A converter 344, is supplied to the addition circuits 332a and 332b via the gate circuits 341a and 341b.

This compensating pattern signal is as represented by FIG. 20(g) and is capable of shifting the shifting means to an extent from 0 to −2 TP during the one field period. The compensating signal is formed by the oscillator 342, the counter 343 and the D/A converter 344. The oscillator 342 has an oscillation frequency which is two times as high as the frequency of the capstan FG signal obtained at a normal tape speed. In other words, the oscillator may be considered to have an oscillation frequency twice as high as that of the oscillator 27 of FIG. 2.

The inverting amplifiers 333a and 333b and the switches 334a and 334b are arranged in consideration of the travelling direction of tape. When the tape travels in the reverse direction, signals are produced through the inverting amplifiers 333a and 333b to cause the analog switches 334a and 334b to produce output signals as represented by FIGS. 20(i) and 20(j), respectively. Such being the arrangement of this embodiment, the signal to be impressed on the conversion element in the process of shifting the head which is in reproducing operation never has any sudden change in level immediately before it is impressed on the conversion element.

Further, a sudden level change caused by the second pattern signal (still pattern signal) can be compensated for without fail by not impressing the second pattern signal during a period of shifting the head which is not in reproducing operation. The second pattern signal, which is produced from the D/A converter 29, is supplied to the addition circuits 335a and 335b. The switches 336a and 336b are under the control of the HSW signal. They are connected to their terminals on one side A during the periods of A1, A2, . . . , and to their terminals on the other side B during the periods of B1, B2, . . . . Then, pattern signals, which are as represented by full lines of FIGS. 20(k) and 20(l), are obtained from output terminals 326a and 326b and are respectively supplied to the conversion elements 3A and 3B. Pattern signals which are indicated by a broken lines in FIGS. 20(k) and 20(l), respectively, represent conventional pattern signals.

With the pattern signal generating circuit of the embodiment arranged as described above, the possibility of unstable control due to ringing of the conversion elements is obviated thereby permitting satisfactory tracking. In driving the pair of conversion elements, the embodiment does not form fixed pattern signals by using separately arranged circuits. Therefore, the circuit arrangement of the embodiment is relatively simple.

Figure 21:
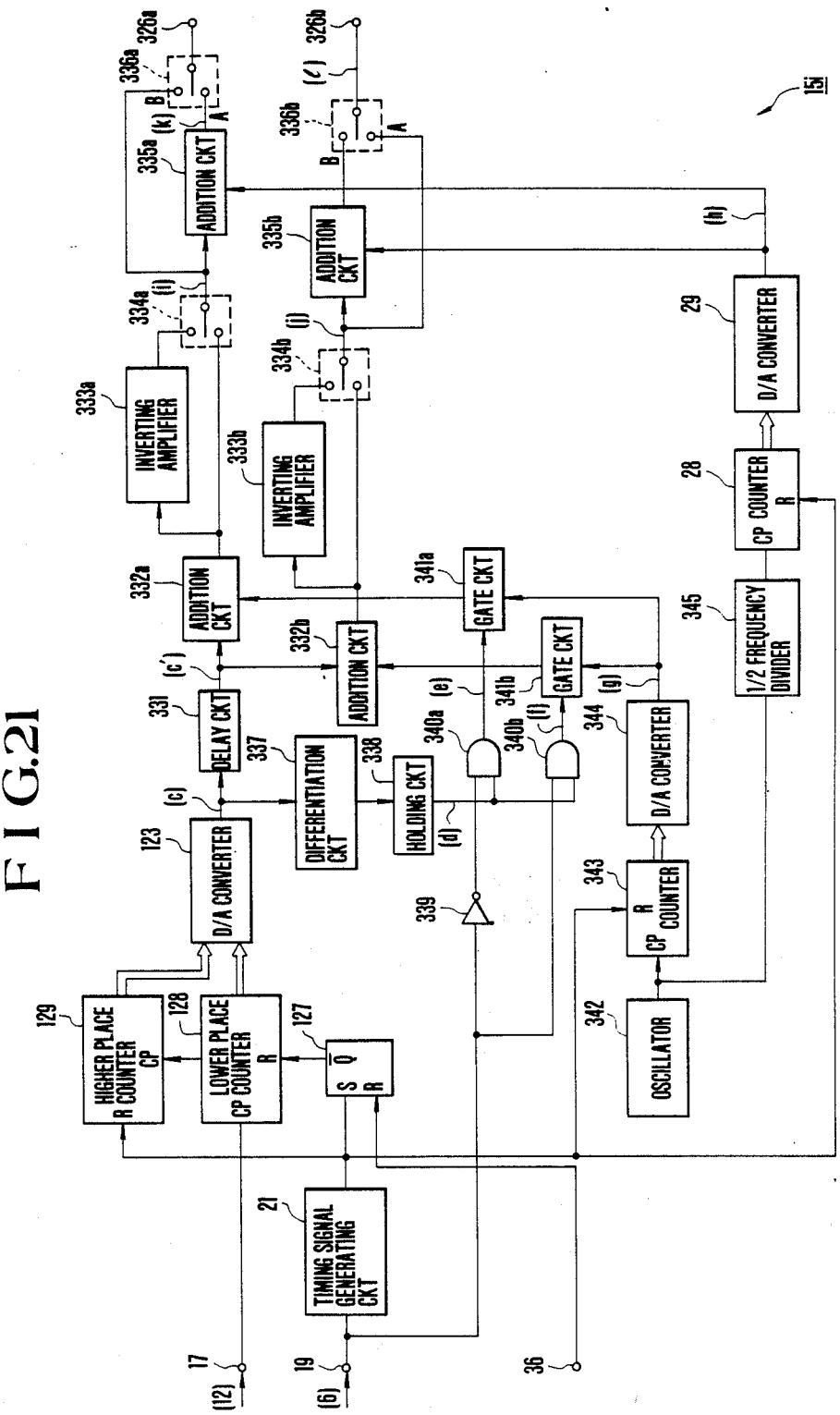
FIG. 21 is a block diagram showing a pattern signal generating circuit of a VTR arranged as a further embodiment of the invention.

FIG. 21 shows a pattern signal generating circuit 15*i* of a VTR arranged as another embodiment of the invention. In FIG. 21, parts the same as those shown in FIGS. 6 and 19 are indicated by the same reference numerals. In this case, the concept of the embodiment shown in FIG. 19 is applied to a VTR which is not using a CTL signal. The operation of this embodiment will be apparent from the timing charts of FIGS. 20(*a*)–20(*l*) and with reference to FIGS. 6 and 19 together with the description of them given in the foregoing.

Figure 22:
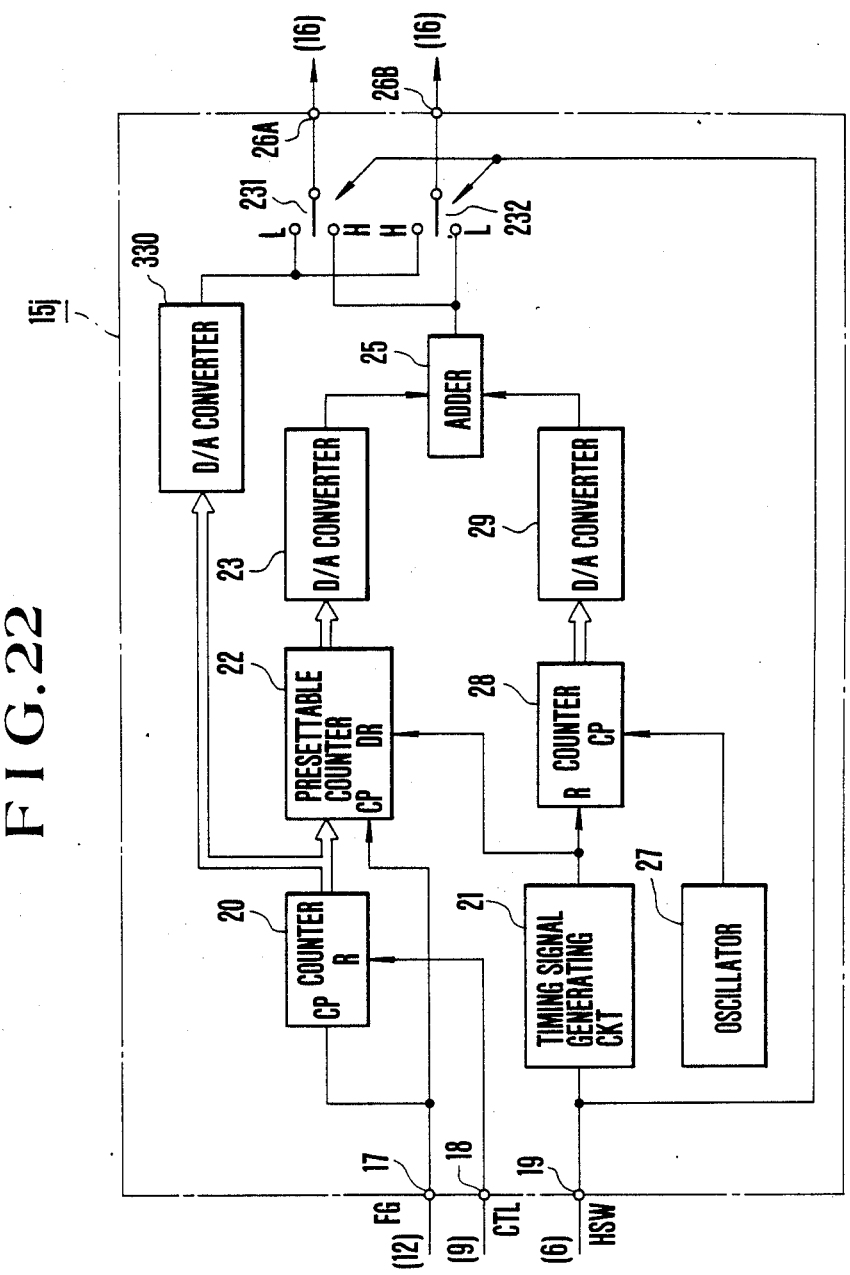
FIG. 22 is a block diagram showing a pattern signal generating circuit of a VTR arranged as a further embodiment of the invention.

FIG. 22 is a block diagram showing a pattern signal generating circuit 15*j* which forms an essential part of a VTR as a further embodiment of the invention. In FIG. 22, parts the same as those shown in FIG. 11 are indicated by the same reference numerals and are omitted from description given here. In this case, a signal obtained by adding the above-stated still pattern signal to the output of the D/A converter 23 is used only for the shifting means shifting the head which is in reproducing operation. Meanwhile, for the shifting means shifting the head not in reproducing operation, the output signal produced from a D/A converter 330 is used. Since the pattern signals for these heads are obtained in this manner, the arrangement of this embodiment effectively prevents a sudden rise which takes place in the shifting means dirving pattern signal in response to a sudden rise of the still pattern signal generated immediately before each field. As for a sudden fall which takes place in response to a fall of the first pattern signal (or the output of the presettable counter 22), the embodiment also prevents it from arising immediately before reproduction by shifting the falling time of the first pattern signal within the period of non-reproducing operation.

Figure 23:
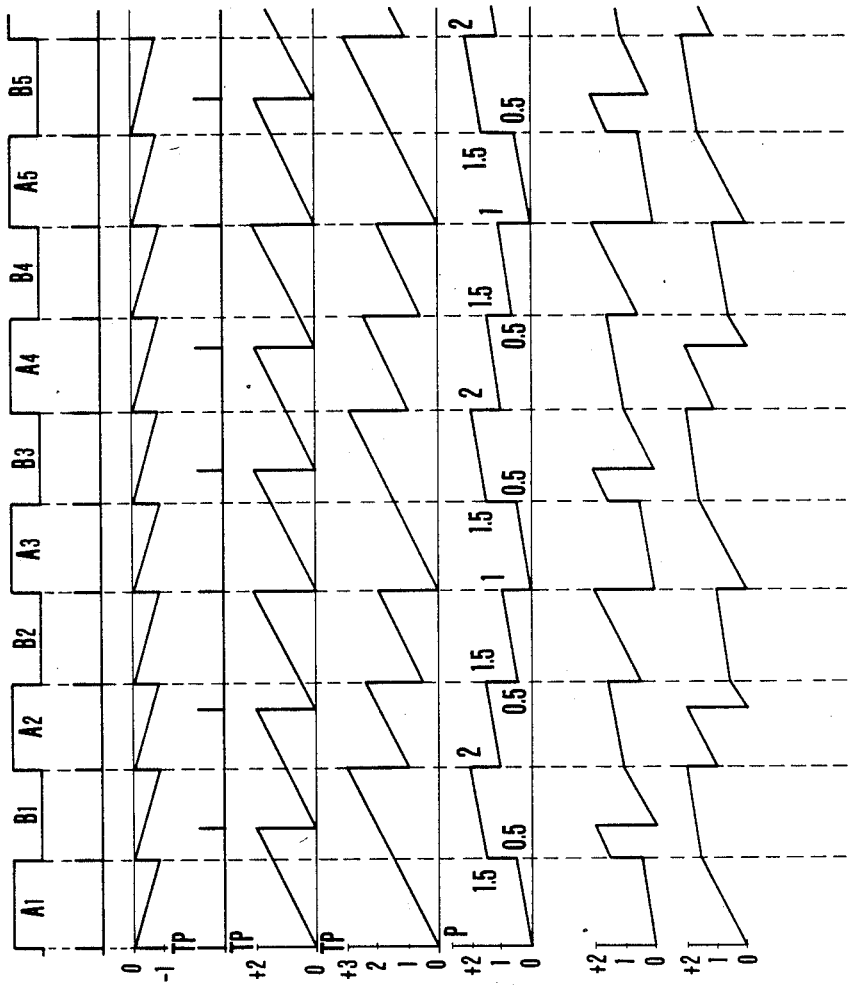
FIGS. 23(a) to 23(i) show the output waveforms of various parts of FIG. 22.

FIGS. 23(*a*)–23(*i*) are timing charts showing the output waveform of various parts shown in FIG. 22. The shifting means are arranged to be driven with the waveforms represented by FIGS. 23(*g*) and 23(*i*). The head 2A performs reproduction during periods indicated by A1, A2, A3, . . . , while another head 2B performs reproduction during other periods indicated by B1, B2, B3, . . . This arrangement almost completely eliminates the possibility of controlling the shifting means carrying the head which is in reproducing operation with a pattern signal which is in a state immediately after a sudden rise or fall. Therefore, unstable control due to ringing of the shifting means can be almost completely prevented to ensure satisfactory tracking control of the heads.

Figure 24:
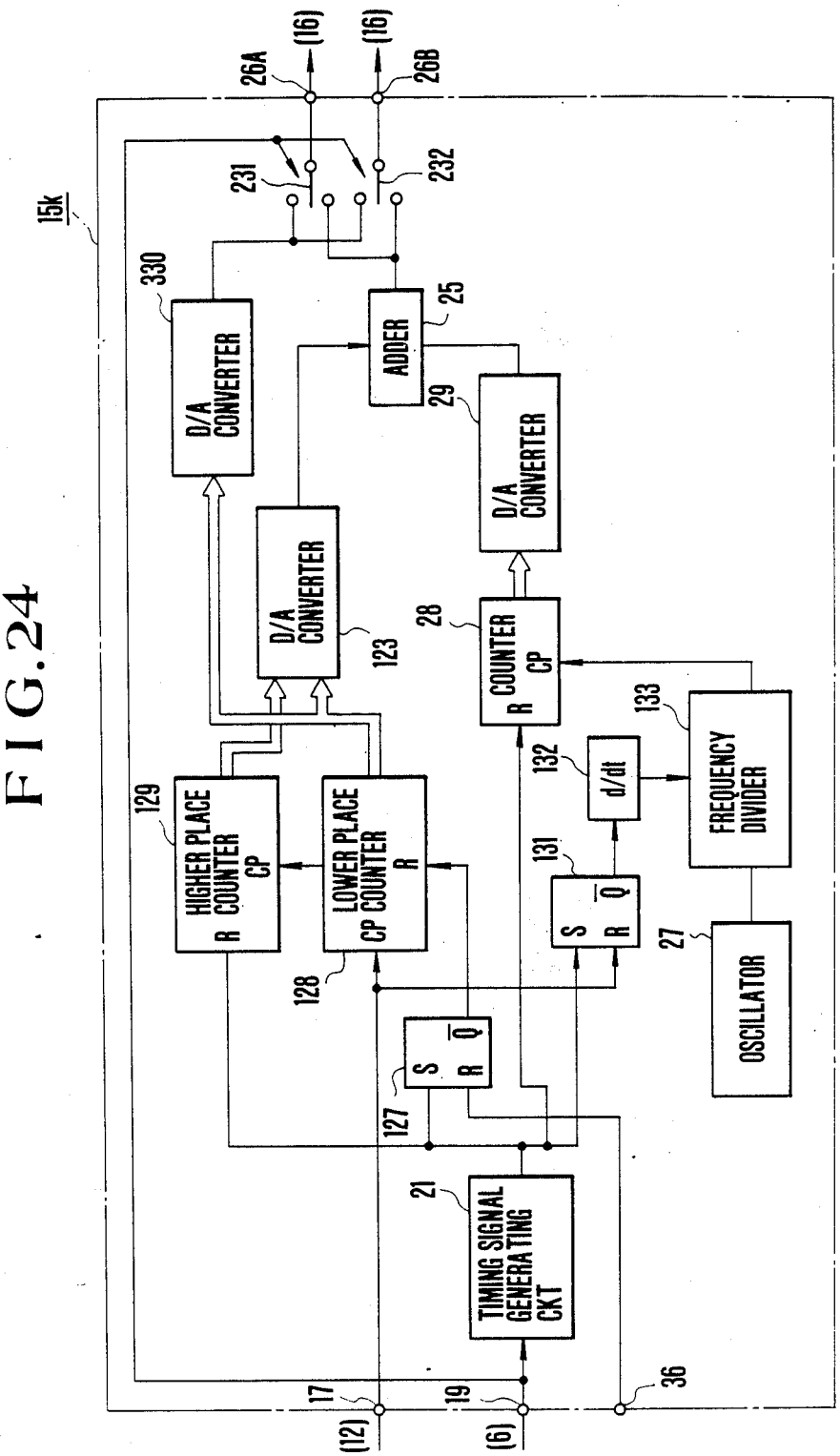
FIG. 24 is a block diagram showing a pattern signal generating circuit of a VTR arranged as a further embodiment of the invention.
Figure 25:
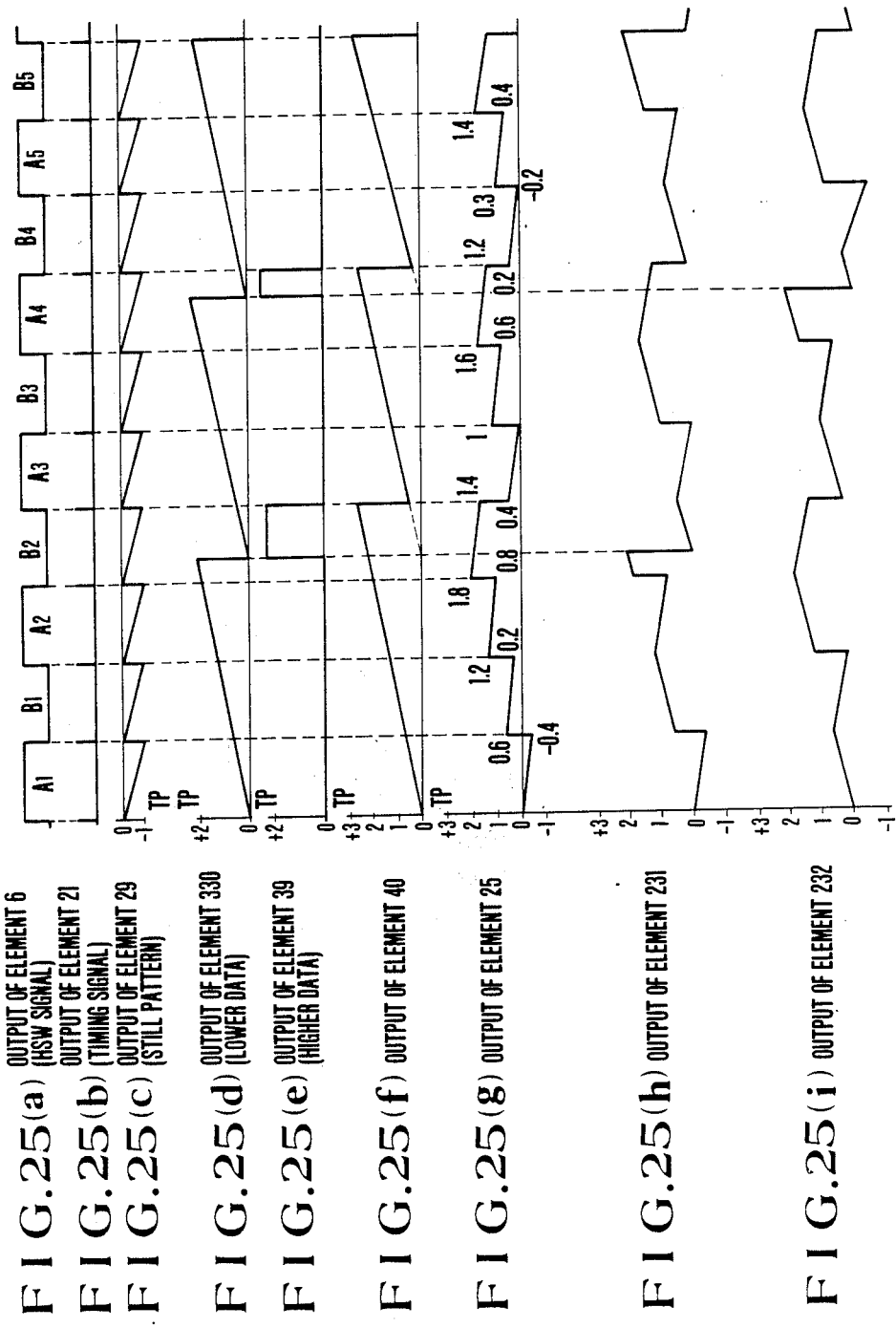
FIGS. 25(a) to 25(i) show the output waveforms of various parts shown in FIG. 24.

FIG. 24 shows a pattern signal generating circuit 15*k* which is arranged as another embodiment of the invention with the concept described above applied to a VTR not using a CTL signal. In FIG. 24, the parts which are the same as those shown in FIG. 22 or 6 are indicated by the same reference numerals. FIGS. 25(*a*)–25(*i*) are timing charts showing the output waveforms obtained from various parts of the embodiment shown in FIG. 24 in the even of 0.6 times speed reproduction.

It is evident from FIGS. 25(*a*)–25(*i*) that the pattern signal generating circuit 15*k* simply enables a VTR not using the CTL signal to suppress instability of control due to ringing of the shifting means.

Figure 26:
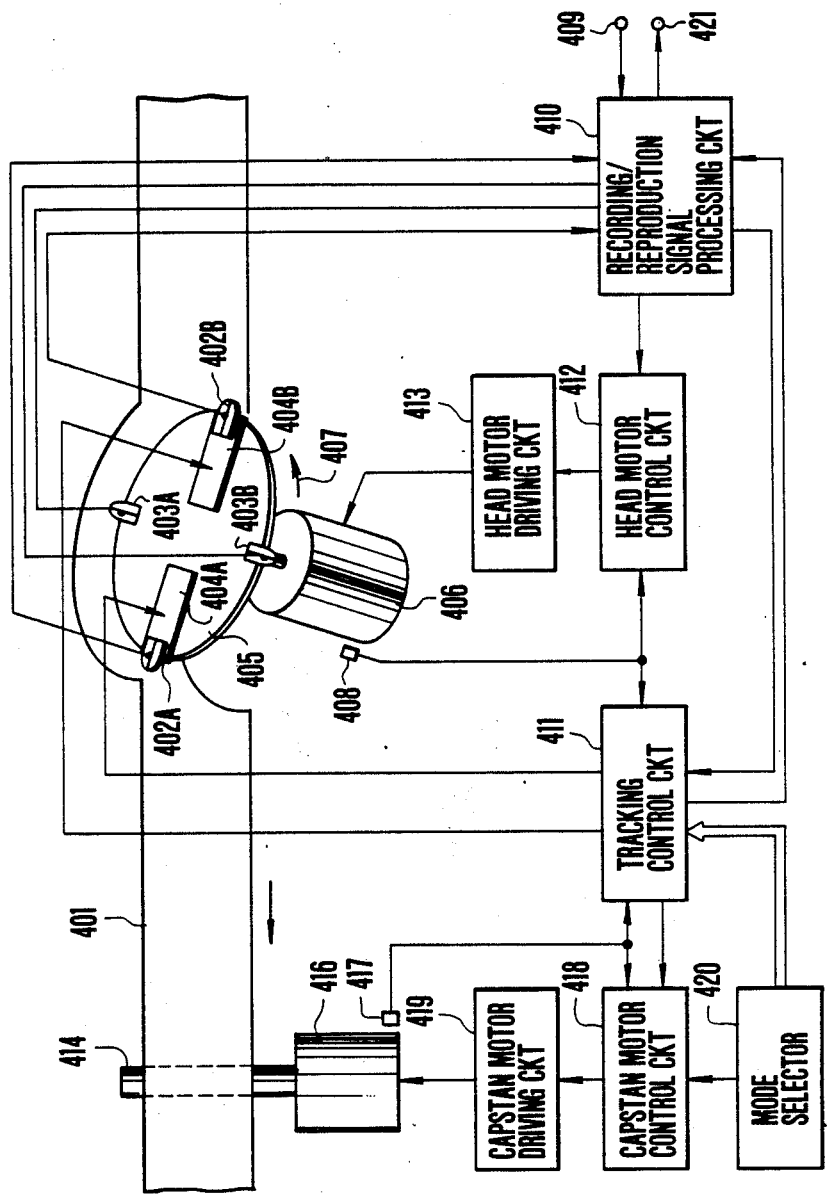
FIG. 26 is a schematic illustration showing the essential parts of a VTR arranged as a still further embodiment of the invention.

The following description deals with another embodiment in which this invention is applied to a VTR perfomring tracking control by using a pilot signal instead of the CTL signal:

FIG. 26 schematically shows the arrangement of a VTR as a further embodiment of the invention. The illustration includes a magnetic tape 401 serving as record bearing medium, varied-speed reproducing magnetic heads 402A and 402B; and magnetic heads 403A and 402B, for recording and normal-speed reproduction (reproduction at the same speed as the speed employed for recording). The heads 403A and 403B differ 180° in rotation phase from each other and have different azimuth angles. Meanwhile, the heads 402A and 402B differ 180° in rotation phase but have the same azimuth angle. The azimuth angle of the heads 402A and 402B is arranged to be the same as that of either the head 403A or 403B.

Bi-morph elements 404A and 404B are arranged to have the heads 402A and 402B, respectively, attached to their free ends and to serve as head shifting means. The fixed ends of the bi-morph elements 404A and 404B and the heads 403A and 403B are mounted to a rotating member 405. The rotating member 405 is rotated by a head rotating motor 406 in the direction of arrow 407. Although it is omitted in the illustration, these heads 402A, 402B, 403A and 403B are arranged to be rotated, as well known, in a state such that they protrude out of a slit provided between a pair of drums. The tape 401 is wrapped around the pair of drums over an angular range of at least 108°. A rotation phase detector 408 is arranged to detect the rotation phase of the rotating member 405. A rectangular wave signal of 30 Hz (hereinafter will be called the 30 PG signal) is produced in synchronism with the rotation of the rotating member 405. An input terminal 409 is arranged to receive a video signal. The video signal supplied to the input terminal 409 is transformed by a recording/reproduction signal processing circuit 410, into a signal form suitable for recording and is supplied to the heads 403A and 403B after a pilot signal, which may have one of four different frequencies and is obtained from a tracking control circuit 411 as will be described later, is superimposed thereon. A video signal output terminal 421 is arranged to produce a video signal reproduced either by the heads 402A and 402B or by the heads 403A and 403B after the reproduced video signal is processed back to its original signal form by the recording/reproduction signal processing circuit 410. A head motor control circuit 412 controls the head motor 406 via a head motor driving circuit 413 on the basis of the 30 PG signal in such a manner as to cause the heads 402A and 402B or 403A and 403B to rotate at a predetermined rotational frequency (e.g., 60 turns per sec) and at a predetermined phase. In recording, a vertical synchronizing signal separated by the recording/reproduction signal processing circuit 410 from the video signal supplied to the input terminal 409, is also used for the above-stated control.

A capstan 414 moves the tape 401 in the longitudinal direction thereof as indicated by an arrow 415 in conjunction with a pinch roller (not shown). A capstan motor 416 rotates the capstan 414. A frequency signal generator 417 is arranged to generate a frequency signal (hereinfter called the FG signal) which corresponds to the rotation of the capstan 414. A capstan motor control circuit 418 is arranged to control the capstan motor 416 via a capstan motor driving circuit 419 on the basis of the FG signal in such a way as to cause the capstan 414 to rotate at a predetermined phase and at a predetermined rotational frequency. A mode selector 420 is provided with, for example, an operation switch, etc., and is arranged to permit mode selection. The capstan motor control circuit 148 and the tracking control circuit 411 are arranged to control the capstan 414 and the bi-morph elements 404A and 404B in accordance with a mode designated by the mode selector 420.

Figure 27:
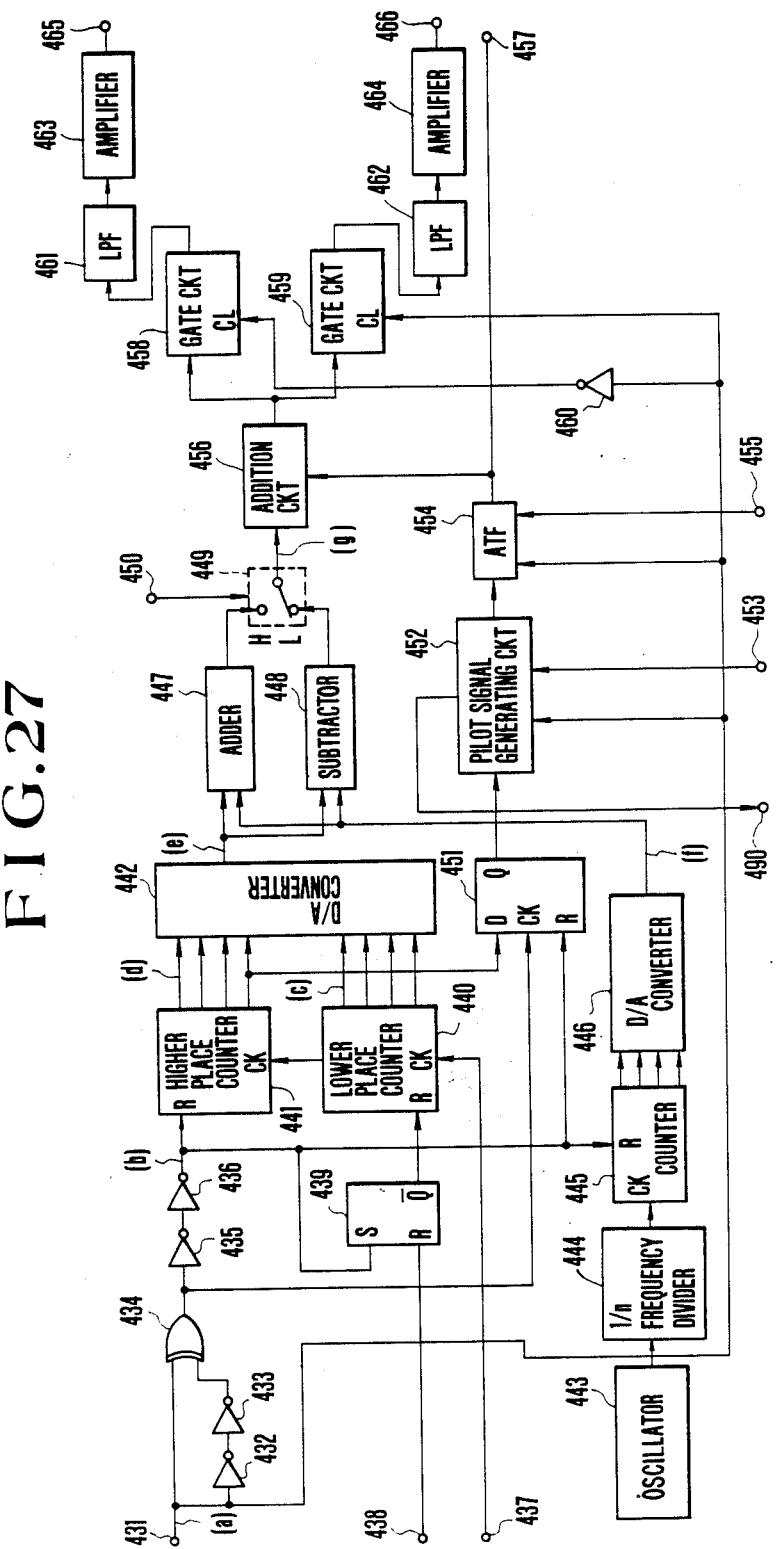
FIG. 27 is a circuit block diagram showing a specific arrangement of a tracking control circuit shown in FIG. 26.

FIG. 27 shows specific arrangement of the tracking control circuit 411 shown in FIG. 26. Referring to FIG. 27, the circuit 411 is provided with a terminal 431 for receiving the 30 PG signal supplied thereto from the rotation phase detector 408. For the sake of simplification of description, let us assume that the fall and rise of the 30 PG signal coincide with the timing of switchover between the heads 402A and 402B. There are provided inverters 432 and 433 which somewhat delay the phase of the 30 PG signal. An exclusive OR circuit 434 (hereinafter called EXOR) exclusive ORs the 30 PG signal and the inverter 433 and generates short pulses as the rise and fall of the 30 PG signal. The circuit 411 further includes additional inverters 435 and 436 which also somewhat delay the phase of the output of the EXOR 434. An input terminal 437 receives the FG signal of the FG signal generator 417 as a pulse signal. Another input terminal 438 receives a pulse signal during a period after an instruction is issued by the mode selector 420 for commencement of varied speed reproduction and before the actual commencement thereof. The circuit 411 is further provided with an S-R flip-flop 439, a counter 440, which counts the pulses of the FG signal and is reset by the output of the terminal $\overline{Q}$ of the flip-flop 439, and another counter 441 which counts the over-flow signal of the counter 440 and is reset by the output of the inverter 436. The number of pulses of the FG signal to be produced when the record bearing medium 401 is moved to an extent of one track pitch (TP) is set at 416 and each of the counters 440 and 441 is 4 bits. A D/A converter 442 performs a digital-to-analog (D/A) conversion on the output data of these counters 440 and 441. A reference numeral 443 denotes an oscillator; 444 denotes a 1/n frequency divider which is arranged to generate 8 pulses in 1/60 sec; 445 denotes a counter which is arranged to count the pulses produced from the frequency divider 444 and to be reset by the output of the inverter 436; 446 denotes a D/A converter which is arranged to D/A convert the output of the counter 445; 447 denotes an adder which is arranged to add up the output of the D/A converter 442 and that of the D/A converter 446; and 448 denotes a subtractor which is arranged to subtract the output of the D/A converter 442 from the output of the D/A converter 446. The output of either the adder 447 or the subtractor 448 is used as a pattern signal for driving the bi-morph element in the event of varied speed reproduction. A switch 449 is arranged to select the output of the adder 447 or that of the subtractor 448 to use it as the pattern signal for that purpose. This switch 449 is under the control of a signal which is produced from the mode selector 420 via a terminal 450 and is arranged to be at a low level in the event of normal rotation (moves the tape in the same direction as the recording direction) and to be at a high level in the event of reverse rotation (moves the tape in the direction reverse to the recording direction). The switch 449 is thus connected to its terminal on one side L in the event of the normal rotation and to another terminal thereof on the other side H in the event of reverse rotation.

Figure 28:
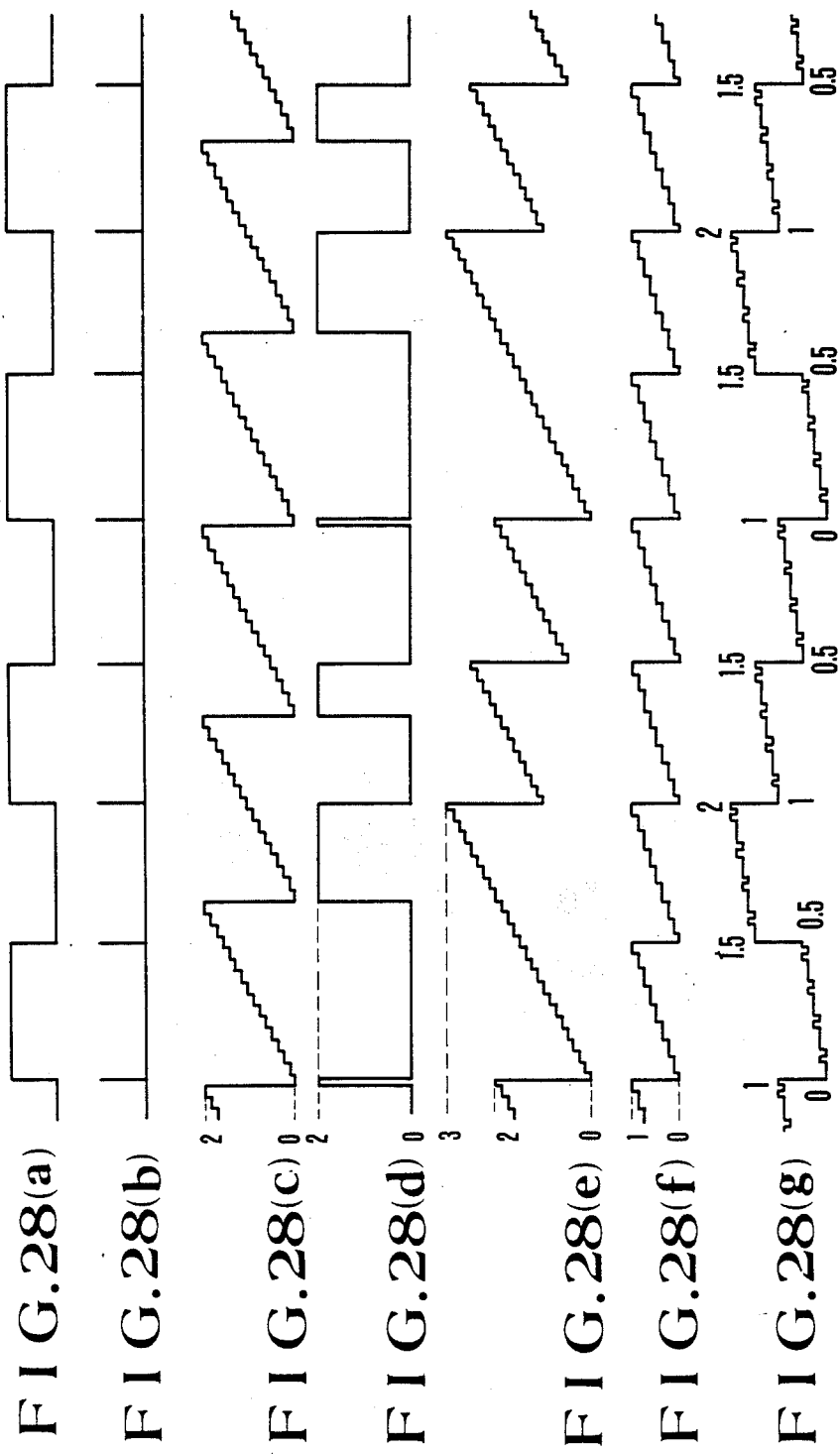
FIGS. 28(a) to 28(g) are timiing charts showing the waveforms of outputs of various parts shown in FIG. 27.
Figure 29:
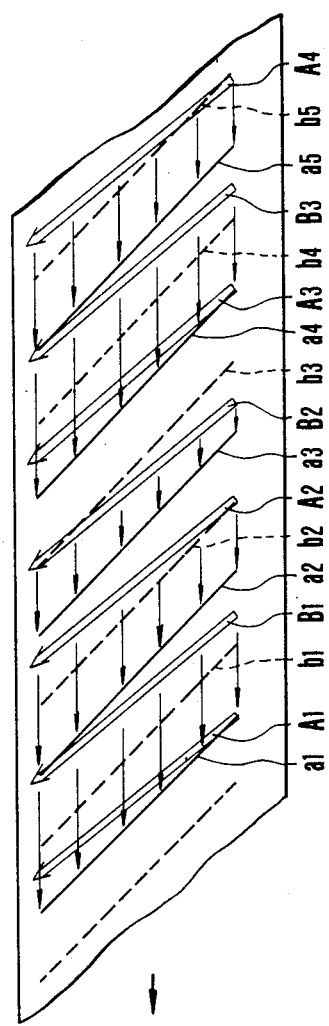
FIG. 29 shows the center loci of scanning performed by reproducing heads in relation to the center loci of recording tracks on a tape in the event of reproduction at a speed increased by 1.5 times.

The bi-morph element driving pattern signal is formed in the following manner: In the event of reproduction by moving the tape at a speed increased by 1.5 times in the same direction as the recording direction, for example, the output waveforms of points (a)-(e) shown in FIG. 27 are as represented in FIGS. 28(a)-28(e) which are timing charts. FIG. 29 shows the relation of the center loci of scanning performed by the heads 402A and 402B to the center loci of the recording tracks on the tape in the event of 1.5 times speed reproduction. With the power supply to the apparatus switched on, when an instruction for 1.5 times speed reproduction is given by the mode selector 420, a pulse signal is supplied via the terminal 438 to keep the flip-flop 439 in a reset state. Following that, the head motor 406 causes the heads 402A and 402B to rotate. Then, the 30 PG signal, which is as represented in FIG. 28(a), is produced from the rotating phase detector 408 and is supplied to the terminal 431. The inverter 436 produces timing pulses, as represented in FIG. 28(b) approximately in synchronism with the fall and rise of the 30 PG signal. When the supply of the pulse signal from the terminal 438 comes to a stop, a timing pulse obtained immediately after the stop, as shown in FIG. 28(b), sets the flip-flop 439 and the output level of the terminal $\overline{Q}$ of the flip-flop becomes low. This causes the lower place counter 440 to begin to count the FG signal pulses coming from the terminal 437. The apparatus then begins to perform reproduction at the speed increased by 1.5 times. The shifting position of the head has not been determined at this point of time. However, the head position is to be corrected by controlling the capstan motor 416 with a tracking signal (hereinafter called the ATF signal) which will be described later. A stabilized condition after this correction is as follows:

The lower place counter 440 produces an over-flow signal the instant 2 TP portions of the FG signal (16 pulses) have been received and is reset by itself to return its count value to zero. Therefore, when D/A converted, the output of the lower place counter 440 is as represented in FIG. 28(c). Then, the output of the higher place counter 441, which counts the over-flow signal produced from the lower place counter 440, is as represented in FIG. 28(d). Therefore, the output of the D/A converter 442, which is a composite count output of the counters 440 and 441, is as represented in FIG. 28(e). The signal shown in FIG. 28(e) has an inclination relevant to the tape moving speed.

The output of the oscillator 443 is frequency divided by 1/n at the frequency divider 444 and is thus made into a pulse signal of 480 Hz having 8 pulses in 1/60 sec. This pulse signal is counted by the counter 445, which is arranged to be reset by the timing pulses produced from the inverter 436 as shown in FIG. 28(b). However, since the timing pulses are produced at intervals of 1/60 sec, the counter 445 is reset every time 8 pulses (corresponding to 1 TP) are counted. As a result, the output waveform of the D/A converter 446 is as represented in FIG. 28(f).

The outputs of these D/A converters 442 and 446 are supplied, respectively, to the adder 447 and the subtracter 448. One of them is then selected by the switch 449. Since there obtains normal rotation in the event of the 1.5 times speed reproduction, the terminal 450 receives a low level input signal. The switch 449 is connected to the terminal on the side L thereof. Therefore, the output waveform of the switch 449 is as represented in FIG. 28(g).

The center loci of tracking performed by the heads 402A and 402B relative to the recording track on the tape 401 are as shown in FIG. 29 in the event of 1.5 times speed reproduction. Referring to FIG. 29, reference symbols A1, A2, A3, . . . , denote the center loci of the head 402A; B1, B2, B3, . . . , the center loci of the head 402B; and a1, a2, a3, . . . , the center loci of the recording tracks formed by the head 403A on the tape. The head 403A is assumed to have the same azimuth angle as that of the heads 402A and 402B. As apparent from FIG. 29, in order to adjust the head locus A1 to the track locus a1 in a first field, the head 402A must be continuously shifted to an extent from 0 to +0.5 TP within the scanning range for the first field. In a second field, to also adjust the head locus B1 to the track locus a1, the head 402B must be continuously shifted to an extent from +1 TP to +2 TP within the scanning range for the second field. In a third field, to adjust the head locus A2 to the next track locus a2, the head 402A must be continuously shifted from +1 TP to +1.5 TP within the scanning range for the third field. In a fourth field, to adjust the head locus B2 to the track locus a3, the head 402B must be continuously shifted from +0.5 TP to +1 TP within the scanning range for the fourth field. After that, the above-stated adjustment must be repeated in a cycle of four fields. The pattern signal shown in FIG. 28(g) is capable of meeting this requirement for shifting the heads 402A and 402B.

While the 1.5 times speed reproduction is taken up, by way of example, in the above description of the operation of this embodiment, a pattern signal suited to any other reproducing speed than the 1.5 times speed can be obtained from the above-stated adder 447 and the subtractor 448 for the control of the heads 402A and 402B. Further, the output waveform of FIG. 28(g) includes many small stepwise variations. However, these small variations are removed by means of a low-pass filter (LPF) in a manner as will be described later.

The rest of FIG. 27 is arranged as follows: A D flip-flop 451 is arranged to have the information of the lowest place bit of the above-stated higher place counter 441 supplied to the input terminal D thereof, to have pulses produced from an EXOR 434 supplied thereto as a clock input and to have pulses produced from an inverter 436 supplied thereto as a reset input. The D input of the flip-flop 451 is, therefore, either "0" or "1". The lowest place datum obtained immediately before the higher place counter 441 is reset every time the timing pulse is produced, becomes a pulse signal, which is produced from the terminal Q of the flip-flop 451 and supplied to a pilot signal generating circuit 452. A terminal 453 is arranged to receive a signal of the mode selector 420 which becomes a high level only when a varied reproducing speed is selected. The pilot signal generating circuit 452 is arranged to discern the kind of a pilot signal superimposed on a recording track currently traced by the rotating head 402A or 402B out of the four different kinds of pilot signals on the basis of the output Q of the D flip-flop 451. Then, the pilot signal generating circuit 452 supplies an automatic tracking signal forming circuit 454 (ATF circuit) with a pilot signal of the same kind as the kind discerned. The reason why the kind of the pilot signal is discernible on the basis of the output of the D flip-flop 451 is as follows:

In FIG. 29, reference symbols b1, b2, b3, . . . , denote the center loci of recording tracks formed by a head 403 which has an azimuth angle differing from that of the heads 402A and 402B. Let us assume that the frequencies of the pilot signals of four different kinds are f1, f2, f3 and f4 and that the frequency f1 is superimposed on the track loci a1, a3, a5, . . . ; the frequency f3 on the track loci a2, a4, a6, . . . ; the frequency f2 on the track loci b1, b3, b5, . . . ; and the frequency f4 on the track loci b2, b4, b6, . . . , respectively. Since these recording tracks are to be reproduced by the heads 402A and 402B at the time of varied speed reproduction, the loci of tracing to be performed with these heads may be expressed as ai (wherein i represents an integer). Therefore, the pilot signal superimposed on these loci is either of the frequency f1 or f3. In case that the same track is to be traced, the difference between the extent of displacement of the bi-morph element 404A or 404B at the end of each tracing process performed by the head 402A or 402B and the extent of displacement of the other bi-morph element 404B or 404A at the beginning of a next tracing process performed by the other head 402B or 402A is +1 TP. Whereas, in case of tracing a next recording track or, for example tracing the locus a2 after the locus a1, the difference is $(+1-2)$ TP. Then, in case of tracing another locus a3 after the locus a1, the difference becomes $\{+1-2(j-i)\}$ TP. The correction for this difference portion $-2(j-i)$ TP is accomplished by resetting the higher place counter 441 with the timing pulse produced from the inverter 436. In other words, the datum of the higher place counter 441 immediately before resetting is the above-stated value $(j-i)$. If the value of $(j-i)$ is an odd number, the pilot signal superimposed on locus aj is of a different kind from the pilot signal superimposed on a locus ai. If it is an even number (including 0), these pilot signals are of the same kind. Whether the value of $(j-i)$ is an odd number or an even number can be determined by whether the datum of the lowest place of the higher place counter 441 is "0" or "1". Therefore, when the frequency of the pilot signal superimposed on the locus of the track traced before the timing pulse is f1, if the datum of the lowest bit of the higher place counter 441 obtained immediately before generation of the timing pulse is "1", the frequency of the pilot signal superimposed on the locus of the track traced after generation of the timing pulse is f3. If it is "0", the frequency of the pilot signal is f1.

Figure 30:
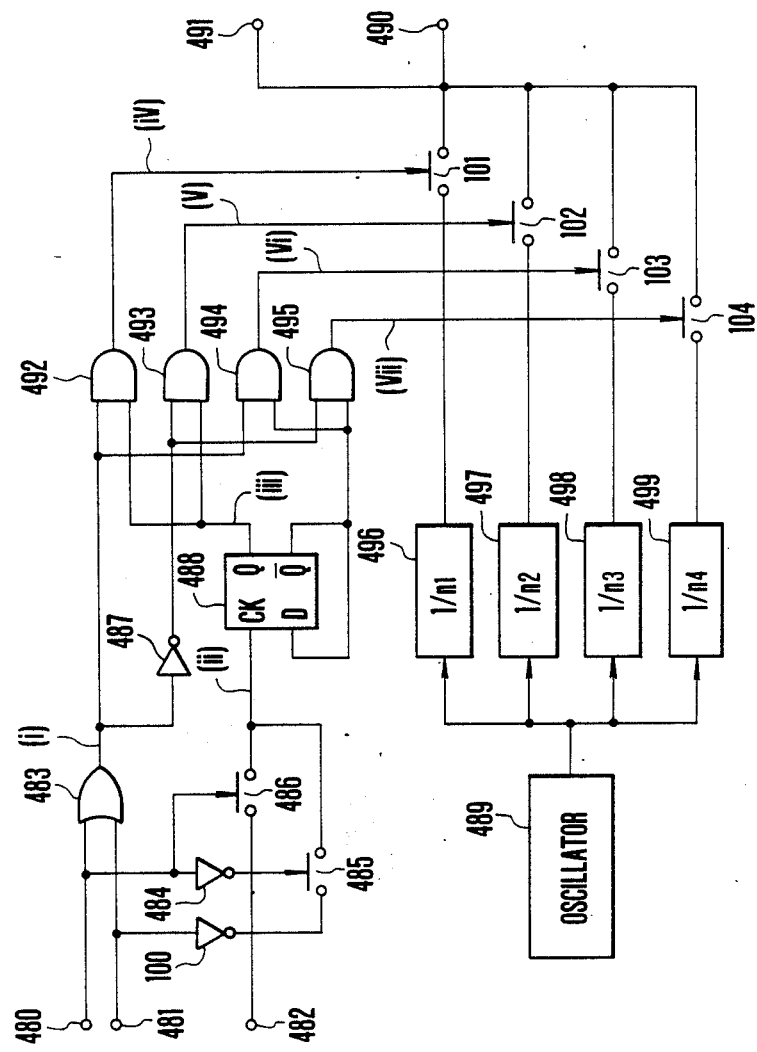
FIG. 30 is a block diagram showing a specific arrangement example of a pilot signal generating circuit shown in FIG. 27.

FIG. 30 shows, by way of example, a specific arrangement of the pilot signal generating circuit 452 of FIG. 27 to which the principle described above is applied. Referring to FIG. 30, the pilot signal generating circuit includes a terminal 480 which receives a high level signal from the mode selector 420 of FIG. 26 only in the event of varied speed reproduction. A terminal 481 is arranged to receive the 30 PG signal. Another terminal 482 is arranged to receive the output Q of the D flip-flop 451 of FIG. 27. The pilot signal generating circuit further includes an OR circuit 483, an inverter 484, analog switches 485 and 486, an inverter 487, a D flip-flop 488, an oscillator 489, an output terminal 490, which is arranged to supply the recording/reproduction signal processing circuit 410 of FIG. 26 with a pilot signal to be mixed with a video signal in the event of recording, an output terminal 491, which is arranged to supply the ATF circuit 454 of FIG. 27 with a pilot signal for obtaining an ATF signal at the time of reproduction, AND circuits 492, 493, 494 and 495, frequency dividers 496, 497, 498 and 499, an inverter 100, and analog switches 101, 102, 103 and 104.

Figure 31:
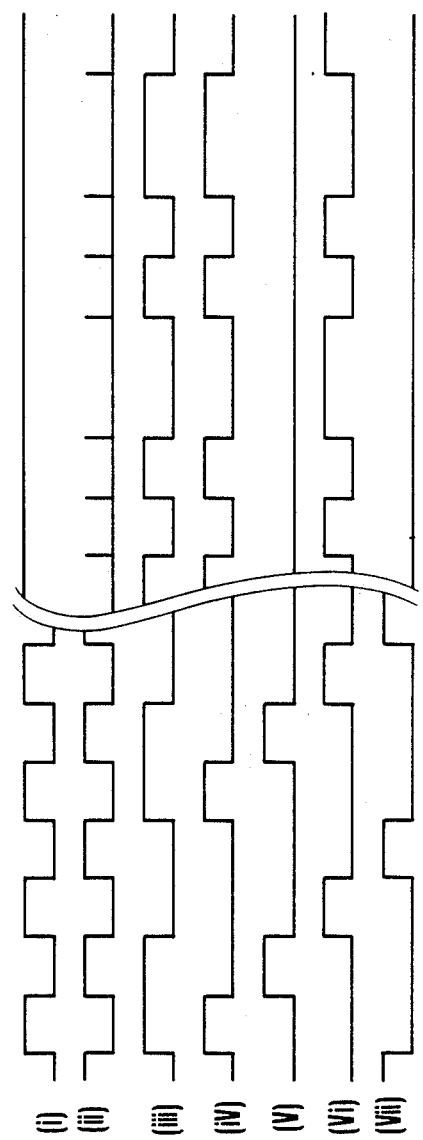
FIG. 31 is a timing chart showing the waveforms of outputs produced from various parts shown in FIG. 30.

The operation of this pilot signal generating circuit is as follows: FIG. 31 is a timing chart showing the waveforms of points (i)-(vii) in FIG. 30. In the case of recording and normal reproduction, the signal supplied to the terminal 480 is always at a low level. The OR circuit 483 produces an output according to the 30 PG signal. Since the analog switch is turned on, an input obtained by inverting the 30 PG signal is supplied to the input terminal CK of the D flip-flop 488. At that time, the waveforms of the points (i)-(vii) are as shown on the left side of FIG. 31. The outputs of the frequency dividers 496, 497, 498 and 499 are supplied one after another to the output terminals 490 and 491. In this instance, the output frequencies of the frequency dividers 496, 497, 498 and 499 are respectively arranged to be f1, f2, f3 and f4.

Meanwhile, in the event of varied speed reproduction, the terminal 480 always receives a high level signal. Therefore, the output level of the OR circuit 483 is always high. The output levels of the AND circuits 493 and 495 are always low. Accordingly, in this event, a pilot signal of frequency f1 or f3 is supplied to the output terminal 491. The output level of the D flip-flop 488 is inverted when there is a pulse signal in the output of the D flip-flop 451, that is, when the lowest bit datum of the higher place counter 441 is at "1" immediately before generation of the timing pulse. As a result of that, the frequency of the pilot signal, which is generated at that time, is changed either from f1 to f3 or from f3 to f1. With the circuit 452 arranged in this manner, a pilot signal of the same kind as the pilot signal superimposed on the recording track being traced, can be generated without fail even in the case of varied speed reproduction.

Again referring to FIG. 27, with the pilot signal of the same kind as the one superimposed on the track being reproduced, supplied to the ATF circuit 454 as mentioned above, the ATF circuit 454 forms an ATF signal in a known manner as briefly described below:

Let us assume that the above-stated frequencies f1, f2, f3 and f4 are 90 KHz, 110 KHz, 170 KHz and 150 KHz, respectively. First, a signal which is obtained by separating a pilot signal from a signal produced from the reproducing head by the recording/reproduction signal processing circuit 410 (and which is supplied from the terminal 455 of FIG. 27) and a signal which is of the same frequency as the pilot signal superimposed on the track being reproduced are subjected to multiplication. Then, the level of a signal of 20 KHz which is obtained through this multiplication is compared with the level of a signal of 60 KHz. Then, the STF signal is obtained by determining in which direction the reproducing head is deviating from the track being reproduced according to the result of the level comparison. In this instance, however, the directions in which a 20 KHz component and a 60 KHz component are obtained vary with the recording track being reproduced. Therefore the output of the above-stated comparison must be inverted as necessary. In the event of the varied speed reproduction which is to be carried out as mentioned in the foregoing, the comparison output does not have to be inverted.

The ATF signal which is thus obtained, is supplied, via the terminal 457, to the capstan motor control circuit 418 and also supplied to the addition circuit 456. At the addition circuit 456, the ATF signal and the pattern signal for driving the bi-morph elements, which is obtained in the manner as described in the foregoing, are added. There are provided gate circuits 458 and 459 which are arranged to supply control signals to the bi-morph elements 404A and 404B only when the head 402A or 403A is tracing the tape. These gate circuits 458 and 459 are controlled either by the 30 PG signal or a signal obtained by inverting the 30 PG signal. Low-pass filters 461 and 462 are arranged to prevent sudden rises or falls of the control signals and also to remove the stepwise variations caused by the counter 440. Amplifiers 463 and 464 are arranged to have the bi-morph element control signals supplied to the bi-morph elements 404A and 404B through these amplifiers and the terminals 465 and 466.

The VTR which is arranged as described above is capable of discerning the kind of the pilot signal superimposed on a recording track being reproduced by virtue of the count output obtained by counting the FG signal pulses. Therefore, even in the case of varied speed reproduction, tracking can be satisfactorily accomplished by advantageously utilizing the pilot signals superimposed on the recording tracks. Satisfactory tracking thus can be accomplished even for slow motion reproduction or for still picture reproduction.

In the foregoing description of the embodiment of this invention, the varied speed reproduction is described to be accomplished with two reproducing heads of the same azimuth angle. However, in accordance with the arrangement described, the movement of the tracks being traced by the reproducing heads can be detected even in cases where varied speed reproduction is to be carried out with two heads of different azimuth angles, by counting the signal pulses related to the record bearing medium moving operation, such as the FG signal pulses, and the kind of each pilot signal superimposed on the recording track being traced by the reproducing head also can be detected by virtue of the pulse counting arrangement.

Generally, as in the case of the embodiment described, in carrying out a varied speed reproducing operation with such head shifting means as a bi-morph element or the like, the pulses, such as the FG signal pulses that relate to the record bearing medium moving operation, are counted for the purpose of driving the shifting means. Therefore, the arrangement, according to the invention, to discern or discriminate the kind of the pilot signal by advantageously utilizing this counting means, obviates the necessity of providing additional means for the purpose of discriminating the pilot signal.

What is claimed is:

1. A rotating head type reproducing apparatus, for reproducing, with a rotating head, a signal recorded in many recording tracks formed on a record bearing medium at a predetermined track pitch, the rotating head being arranged to trace the recording tracks one after another, comprising:
   (a) moving means for moving said record bearing medium in a direction transverse to said recording tracks;
   (b) shifting means for shifting said rotating head or heads in a direction transverse to a rotating plane thereof;
   (c) pulse signal generating means for generating a pulse signal related to a record bearing medium moving operation of the moving means;

(d) timing signal generating means for generating a timing signal related to the rotation of the rotating head;

(e) counting means for counting said pulse signal, said counting means being arranged to have the count datum thereof return to an initial datum by itself every time a predetermined number of pulses of the pulse signal are counted; and (f) control means arranged to form a control signal for controlling said shifting means by using the count data of the counting means and the timing signal.

2. An apparatus according to claim 1, wherein said control means includes a first counting circuit which is arranged to count every time the count datum of said counting means returns to the initial datum and to be cleared by said timing signal.

3. An apparatus according to claim 2, wherein said control means further includes an oscillation circuit having a predetermined oscillation frequency, and a second counting circuit which is arranged to count a pulse signal produced from said oscillation circuit and to be reset by said timing signal.

4. An apparatus according to claim 1, wherein pilot signals of different kinds having different frequencies are recorded in said recording tracks and superimposed on information signals one by one; and the apparatus is provided with movement control means for controlling said moving means by using pilot signals reproduced by said rotating head from said recorded pilot signals.

5. An apparatus according to claim 4, further comprising rotation control means for keeping the rotation speed of said rotating head at a constant value.

6. A rotating head type reproducing apparatus, for reproducing, with a rotating head, a signal recorded in many recording tracks formed on a record bearing medium at a predetermined track pitch, the rotating head being arranged to trace the recording tracks one after another, comprising:

(a) moving means for moving said record bearing medium in a direction transverse to said recording tracks;

(b) shifting means for shifting said rotating head or heads in a direction transverse to a rotating plane thereof;

(c) first pulse signal generating means for generating a first pulse signal related to a record bearing medium moving operation of the moving means;

(d) means for generating a second pulse signal of a predetermined frequency;

(e) means for adjusting a phase relation between said first and second pulse signals; and (f) control means arranged to form a control signal for controlling said shifting means by using said first and second pulse signals.

7. An apparatus according to claim 6, wherein said control means includes a first pattern signal forming circuit which forms a first pattern signal having an inclination related to the frequency of said first pulse signal; a second pattern signal forming circuit which forms by using said second pulse signals a second pattern signal having an inclination corresponding to difference between the inclination of said recording tracks when said record bearing medium is at rest and the inclination of the tracing locus of said rotating head; and a computation circuit which performs a computing operation on said first and second pattern signals.

8. An apparatus according to claim 6, wherein a timing signal is recorded on said record bearing medium in a direction parallel to the direction in which the record bearing medium is moved by said moving means; and said control means includes a counting circuit which is arranged to count said first pulse signal and to be reset by a timing signal obtained by reproducing said timing signal.

9. An apparatus according to claim 6, wherein said control means includes a counting circuit which counts said first pulse signal, said counting circuit being arranged to have a count datum thereof return to an initial datum every time a predetermined number n of the pulses of said pulse signal are counted.

10. An apparatus according to claim 6, wherein second pulse signal generating means includes an oscillation circuit which produces, by oscillation, a signal of a predetermined frequency, and a frequency dividing circuit which frequency divides the oscillation signal of said oscillation circuit; and said adjusting means includes a reset circuit which resets said frequency dividing circuit according to said first pulse signal.

11. A rotating head type reproducing apparatus, for reproducing, with a rotating head, a signal recorded in many recording tracks formed on a record bearing medium at a predetermined track pitch, the rotating head being arranged to trace the tracks one after another, comprising:

(a) moving means for moving said record bearing medium in a direction transverse to said recording tracks;

(b) shifting means for shifting said rotating head in a direction transverse to a rotating plane thereof;

(c) pulse signal generating means for generating a pulse signal related to a record bearing medium moving operation of said moving means;

(d) means for forming a first pattern signal related to the record bearing medium moving operation of said moving means, said first pattern signal forming means including a counting circuit which counts said pulse signal;

(e) means for forming a second pattern signal related to the rotation of said rotating head;

(f) adjusting means arranged to adjust the phase of said second pattern signal by using said pulse signal for making the phase of said first pattern signal coincide with that of said second pattern signal; and (g) control means for controlling said shifting means by using said first and second pattern signals.

12. An apparatus according to claim 11, wherein said control means includes a computing circuit which performs a computing operation on said first and second pattern signals.

13. An apparatus according to claim 11, wherein a timing signal is recorded on said record bearing medium in a direction parallel to the direction in which the record bearing medium is moved by said moving means; and said counting circuit is arranged to be reset by a timing signal obtained by reproducing said timing signal.

14. An apparatus according to claim 11, wherein said counting circuit is arranged to have a count datum thereof return to an initial datum every time a predetermined number n of the pulses of said pulse signal are counted.

15. A rotating head type reproducing apparatus, for reproducing, with a plurality of rotating heads, a signal recorded in many recording tracks, in which pilot signals of different kinds having different frequencies are recorded, formed on a record bearing medium at a predetermined track pitch, the heads being arranged to trace the tracks one after another, comprising:

(a) moving means for moving said record bearing medium in a direction transverse to said recording tracks;

(b) a plurality of shifting means for shifting said rotating heads in directions transverse to rotating planes thereof;

(c) means for generating a first pulse signal related to a record bearing medium moving operation of said moving means;

(d) means for generating a second pulse signal of a predetermined frequency;

(e) control means arranged to control one of said shifting means for shifting one of said rotating heads, in a reproducing operation, with a first control signal having an inclination determined by the frequencies of said first and second pulse signals, and to control another of said shifting means for shifting another of said rotating heads, not in the reproducing operation, with a second control signal having an inclination which at least partially differs from that of said first control signal; and (f) movement control means for controlling said moving means by using the pilot signals reproduced by said rotating head.

16. An apparatus according to claim 15, wherein said second control signal has an inclination determined by the frequency of said first pulse signal.

17. An apparatus according to claim 15, wherein said first and second control signals become the same level at least once in a predetermined period in the instant of change-over of said rotating heads from a non-reproducing state to a reproducing state.

18. A rotating head type reproducing apparatus, for reproducing, with a plurality of rotating heads, a signal recorded in many recording tracks formed on a record bearing medium at a predetermined track pitch, said head being arranged to trace the tracks one after another, comprising:

(a) moving means for moving said record bearing medium in a direction transverse to said recording tracks;

(b) a plurality of shifting means for shifting said rotating heads in directions transverse to rotating planes thereof;

(c) means for forming a first pattern signal related to a record bearing medium moving operation of said moving means;

(d) means for forming a second pattern signal related to the rotation of said rotating heads; and (e) control means arranged to control one of said shifting means for shifting one of said rotating heads, in a reproducing operation, with said first and second pattern signals, and to control another of said shifting means for shifting another of said rotating heads, not in the reproducing operation, solely with said first pattern signal.

19. An apparatus according to claim 18, wherein said control means includes a computing circuit which performs a computing operation on said first and second pattern signals, and a switching circuit which selectively produces either a signal produced from said computing circuit or said first pattern signal.

20. An apparatus according to claim 18, wherein said second pattern signal forming means includes a counting circuit which is arranged to count a second pulse signal of a predetermined frequency and to be reset at a timing related to the rotation of said rotating heads; a count datum of the counting circuit, obtained when the counting circuit is reset, being a number n related to said track pitch.

21. An apparatus according to claim 20, wherein said first pattern signal forming means includes a first pulse signal generator generating a first pulse signal related to the record bearing medium moving operation of said moving means; and a counting circuit which is arranged to count said first pulse signal and to have a count datum thereof return to an initial datum when a number 2n of pulses of the first pulse signal, corresponding to a value twice as much as said track pitch, are counted.

22. An apparatus according to claim 21, wherein said first pattern signal is allowed to become discontinuous only at a timing related to the rotation of said rotating heads and a level change which takes place in the first pattern signal at the point of said discontinuation corresponds to an extent of the displacement of said shifting means, corresponding to a value twice as much as said track pitch or 2m, wherein "m" represents an integer.

23. An apparatus according to claim 20, wherein a timing signal is recorded on said record bearing medium in a direction parallel to the direction in which the record bearing medium is moved by said moving means; and said control means includes a first pulse signal generator which generates a first pulse signal related to the record bearing medium moving operation of said moving means, and a counting circuit which is arranged to count said first pulse signal and to be reset by a timing signal reproduced from said recorded timing signal.

24. A rotating head type reproducing apparatus, for reproducing, with rotating head means, a signal recorded in many recording tracks formed on a record bearing medium at a predetermined track pitch, said head means being arranged to trace the tracks one after another, comprising:

(a) moving means for moving said record bearing medium in a direction transverse to said recording tracks;

(b) shifting means for shifting said rotating head means in a direction transverse to a rotation plane thereof;

(c) means for forming a first pattern signal related to a record bearing medium moving operation of said moving means;

(d) means for forming a second pattern signal related to the rotation of said rotating head means;

(e) means for removing a high frequency component of said first pattern signal; and (f) control means for controlling said shifting means by using said second pattern signal and said first pattern signal with said high frequency component thereof having been removed.

25. An apparatus according to claim 24, wherein said rotating head means and said shifting means are, respectively, arranged in plural numbers; and said control means is arranged to control one of the shifting means for shifting one of the rotating heads, in a reproducing operation, by means of both the first pattern signal with the high frequency component having been removed therefrom and said second pattern signal, and to control another one of said shifting means for shifting another of said heads, not in a reproducing operation, by means of only the first pattern signal with the high frequency component having been removed therefrom.

26. An apparatus according to claim 25, wherein said control means includes a computing circuit arranged to perform a computing operation on said first pattern signal, having the high frequency component thereof removed, and said second pattern signal; and a switching circuit which selectively produces the output signal of said computing circuit or said first pattern signal with said high frequency component having been removed.

27. An apparatus according to claim 25, wherein said second pattern signal forming means includes a counting circuit which is arranged to count a second pulse signal of a predetermined frequency and to be reset at a timing related to the rotation of said rotating heads a count datum of said counting circuit obtained when the counting circuit is reset being a number n related to said track pitch.

28. An apparatus according to claim 27, wherein said first pattern signal forming means includes a first pulse signal generator generating a first pulse signal related to the record bearing medium moving operation of said moving means; and a counting circuit which is arranged to count said first pulse signal and to have a count datum thereof return to an initial datum when a number 2n of the pulses of said first pulse signal, corresponding to a value twice as much as said track pitch, are counted.

29. An apparatus according to claim 28, wherein said first pattern signal is allowed to become discontinuous only at a timing related to the rotation of said rotating heads; and a level change, which takes place in the first pattern signal at the time of said discontinuation, corresponds to an extent of displacement of said shifting means corresponding to a value twice as much as said track pitch or 2m, wherein "m" represents an integer.

30. An apparatus according to claim 27, wherein a timing signal is recorded on said recording bearing medium in a direction parallel to the direction in which the record bearing medium is moved by said moving mens; and said control means includes a first pulse signal generator which generates a first pulse signal related to the record bearing medium moving operation of said moving means and a counting circuit which is arranged to count said first pulse signal and to be reset by a timing signal reproduced from said recorded timing signal.

31. A rotating head type reproducing apparatus, for reproducing, with rotating head means, a signal recorded in many recording tracks formed on a record bearing medium at a predetermined track pitch, said head means being arranged to trace said tracks one after another, comprising:
 (a) moving means for moving said record bearing medium in a direction transverse to said recording tracks;
 (b) shifting means for shifting said rotating head means in a direction transverse to a rotation plane thereof;
 (c) means for forming a first pattern signal related to a record bearing medium moving operation of said moving means;
 (d) means for forming a second pattern signal related to the rotating of said rotating head means;
 (e) means for forming a third pattern signal arranged to remove sudden changes of said first pattern signal; and
 (f) control means for controlling said shifting means by using said first, second and third pattern signals.

32. An apparatus according to claim 31, wherein said rotating head means and said shifting means are, respectively, arranged in plural numbers; said third pattern signal forming means including a generator for generating a third pulse signal of a predetermined frequency and a counting circuit which is arranged to count the third pulse signal and to be reset at a timing related to the rotation of said rotating heads, a count datum of said counting circuit, obtained when the counting circuit is reset, is a number 2n which corresponds to a value twice as much as said track pitch.

33. An apparatus according to claim 32, wherein said second pattern signal forming means includes a frequency dividing circuit which frequency divides said third pulse signal to obtain a second pulse signal, and a counting circuit which is arranged to count said second pulse signal and to be reset at a timing related to the rotation of said rotating heads, a count datum of said counting circuit, obtained when the counting circuit is reset, is a number n which relates to said track pitch.

34. An apparatus according to claim 33, wherein said first pattern signal forming means includes a first pulse signal generator for generating a first pulse signal related to the record bearing medium moving operation of said moving means; and a counting circuit which is arranged to count said first pulse signal and to have a count datum thereof return to an initial datum when a number 2n of the pulses of said first pulse signal, corresponding to a value twice as much as said track pitch, are counted.

35. An apparatus according to claim 34, wherein said first pattern signal is allowed to become discontinuous only at a timing related to the rotation of said rotating head, a level change, which takes place in the first pattern signal at the time of said discontinuation, corresponds to an extent of displacement of said shifting means corresponding to a value twice as much as said track pitch or 2m, wherein "m" represents an integer.

36. An apparatus according to claim 33, wherein a timing signal is recorded on said record bearing medium in a direction parallel to the direction in which the record bearing medium is moved by said moving means; and said control means includes a first pulse signal generator which generates a first pulse signal related to the record bearing medium moving operation of said moving means, and a counting circuit which is arranged to count said first pulse signal and to be reset by a timing signal reproduced from said recorded timing signal.

37. An apparatus according to claim 31, wherein said control means includes a gate circuit which serves as a gate for said third pattern signal according to the level changes of said first pattern signal.

38. An apparatus according to claim 37, wherein said control means includes a first computing circuit which performs a computing operation on said third pattern signal gated by said gate circuit and said first pattern signal.

39. An apparatus according to claim 38, wherein said control means further includes a second computing circuit which performs a computing operation on the output signal of said first computing circuit and said second pattern signal.

40. An apparatus according to claim 39, wherein said control means further includes a switching circuit which is arranged to selectively produce the output signal of said first computing circuit or that of said second computing circuit.

41. An apparatus according to claim 31, wherein said rotating head means and said shifting means are, respectively, arranged in plural numbers; and said control means is arranged to control one of the shifting means for shifting one of the rotating head, in a reproducing operation, by means of said first, second and third pattern signals, and to control another of said shifting means for shifting another of said heads, not in the reproducing operation, by means of said first and second pattern signals.

42. A rotating head type reproducing apparatus, for reproducing, with a plurality of rotating heads, a signal recorded in many recording tracks formed on a record bearing medium at a predetermined track pitch, said heads being arranged to trace said tracks one after another, comprising:
(a) moving means for moving said record bearing medium in a direction transverse to said recording tracks;
(b) a plurality of shifting means for shifting said rotating heads, respectively, in directions transverse to rotation planes thereof;
(c) means for generating a pulse signal related to a record bearing medium moving operation of said moving means;
(d) means for generating a first timing signal related to the rotation of said rotating heads;
(e) means for generating a second timing signal related to the movement of said record bearing medium;
(f) means for forming a first pattern signal which has an inclination related to the frequency of said pulse signal and which becomes discontinuous solely in response to said first timing signal;
(g) means for forming a second pattern signal on the basis of said first timing signal;
(h) means for forming a third pattern signal which has an inclination related to the frequency of said pulse signal and which becomes discontinuous solely in response to said second timing signal; and
(i) control means arranged to use said first and second pattern signals for controlling one of the shifting means for shifting one of the rotating heads in a reproducing operation, and to use only said third pattern signal for controlling another of said shifting means for shifting another of said rotating heads not in the reproducing operation.

43. An apparatus according to claim 42, wherein a control signal is recorded on said record bearing medium in a direction parallel to the direction in which the record bearing medium is moved by said moving means; and said second timing signal generating means includes a fixed head arranged to reproduce said control signal.

44. An apparatus according to claim 42, wherein said second timing signal generating means includes a first counting circuit which is arranged to have a count datum thereof return to an initial datum thereof every time a predetermined number n of the pulses of said pulse signal are counted.

45. An apparatus according to claim 44, wherein said third pattern signal forming means includes said first counting circuit.

46. An apparatus according to claim 45, wherein said first pattern signal forming means includes a second counting circuit which is arranged to count said pulse signal and to have a count datum thereof shift according to said first timing signal to a value either n times or an integer times as much as the count datum.

47. An apparatus according to claim 46, wherein said second counting circuit includes said first counting circuit.

48. An apparatus according to claim 42, wherein said control means includes a computing circuit which performs a computing operation on said first pattern signal and said second pattern signal; and a switching circuit which is arranged to selectively produce the output signal of said computing circuit or said third pattern signal.

49. A rotating head type information signal reproducing apparatus for reproducing an information signal recorded on a record bearing medium in many recording tracks formed at a predetermined track pitch with pilot signals of a plurality of different kinds recorded and superimposed on the information signal in the recording tracks one by one, with a rotating head arranged to trace the recording tracks one after another for reproduction, said apparatus comprising:
(a) moving mens for moving said record bearing medium in a direction transverse to said recording tracks;
(b) means for generating a pulse signal related to a record bearing medium moving operation of said moving means;
(c) counting means for counting said pulse signal, said counting means being arranged to produce a pulse signal every time a predetermined number n of the pulses of said pulse signal are counted; and
(d) means for discriminating the kind of said pilot signal superimposed on the recording track being mainly traced by said rotating head, said discriminating means being arranged to use the pulse signal produced from said counting means for discrimination.

50. An apparatus according to claim 49, wherein said discriminating means is arranged to perform said discrimination in a cycle according to the rotation of said rotating head.

51. An apparatus according to claim 49, further comprising shifting means for shifting said rotating head in a direction transverse to a rotation plane thereof; and control means for controlling said shifting means by using the output of said counting means.

* * * * *